United States Patent [19]

Bhattacharyya et al.

[11] Patent Number: 5,939,353

[45] Date of Patent: *Aug. 17, 1999

[54] METHOD FOR PREPARING AND USING NICKEL CATALYSTS

[75] Inventors: Alakananda Bhattacharyya, Wheaton, Ill.; Wen-Dong Chang, Houston, Tex.; Mark S. Kleefisch, Plainfield; Carl A. Udovich, Joliet, both of Ill.

[73] Assignee: BP Amoco Corporation, Chicago, Ill.

[*] Notice: This patent is subject to a terminal disclaimer.

[21] Appl. No.: 08/935,209

[22] Filed: Sep. 22, 1997

Related U.S. Application Data

[63] Continuation-in-part of application No. 08/445,699, May 22, 1995, Pat. No. 5,767,040, which is a continuation-in-part of application No. 07/993,419, Dec. 21, 1992, abandoned.

[51] Int. Cl.⁶ .............................. B01J 23/58; B01J 23/00
[52] U.S. Cl. .................... 502/524; 502/327; 502/328; 502/335; 502/337; 502/326; 423/593; 423/594; 423/600
[58] Field of Search ................... 502/80, 84, 85, 502/327, 328, 335, 337, 326, 524; 423/593, 594, 600

[56] References Cited

U.S. PATENT DOCUMENTS

| | | | |
|---|---|---|---|
| 4,046,552 | 9/1977 | Chen et al. | 48/102 |
| 4,193,259 | 3/1980 | Muenger et al. | 60/39 |
| 4,202,167 | 5/1980 | Suggitt et al. | 60/39 |
| 4,958,488 | 9/1990 | Wilkes et al. | 60/39 |
| 5,043,150 | 8/1991 | Hiltunen et al. | 423/239 |
| 5,399,537 | 3/1995 | Bhattacharyya et al. | 502/84 |
| 5,767,040 | 6/1998 | Bhattacharyya et al. | 502/524 |

FOREIGN PATENT DOCUMENTS 2085314  4/1982  United Kingdom ............ B01J 23/78

OTHER PUBLICATIONS

Hisao Imai, Koichi Nakamura, "Effect of Hydrogen Reduction on Activity and Selectivity of Methanol Decomposition over Titanium Oxide," Journal of Catalysis 125, pp. 571–573 (1990).

*Primary Examiner*—Glenn Caldarola
*Assistant Examiner*—In Suk Bullock
*Attorney, Agent, or Firm*—Thomas A. Yassen; Robert E. Sloat

[57] ABSTRACT

A direct, simplified and relatively salt-free process is described for making anionic, hydrotalcite-type pillared clay compositions which contain nickel, and their heat-treated derivatives. Compositions of the invention are manufactured from ractants which contain a relatively minor amount of metal salts or, preferably, contain essentially no metal salts. Preferred compositions made by the process form a number of new nickel-containing catalytic materials which are unusually resistant to deactivation, for example resistant to coke formation when used to catalyze chemical conversions of a hydrocarbyl compound with an oxygen-containing gas at elevated temperatures to form synthesis gas.

15 Claims, 1 Drawing Sheet

METHOD FOR PREPARING AND USING NICKEL CATALYSTS

CROSS-REFERENCE TO RELATED APPLICATIONS

This application is a continuation-in-part of application Ser. No. 08/445,699 filed May 22, 1995, now U.S. Pat. No. 5,767,040, which is a continuation-in-part of application Ser. No. 07/993,419 filed Dec. 21, 1992 now abandoned, which applications are specifically incorporated herein in their entirety by reference.

TECHNICAL FIELD

This invention relates to relatively salt-free preparations of anionic, hydrotalcite-type pillared clay compositions and their heat-treated derivatives. More particularly, this invention relates to preparations and uses of new nickel-containing catalytic materials that which are unusually resistant to deactivation, for example resistant to coke formation when used to catalyze chemical conversions of a hydrocarbyl compound with an oxygen-containing gas at elevated temperatures to form synthesis gas.

BACKGROUND OF THE INVENTION

Anionic layered mixed double hydroxide compositions have a structure similar to the mineral brucite in which divalent ions are octahedrally surrounded by hydroxide anions and the resulting octahedra share edges to form sheets. The sheets, which are one of the identifying characteristics of clays, contain metal cations and hydroxide anions in the ratio of about one to two. Wherever trivalent cations take the place of divalent cations in the sheets, a positive charge results which is balanced by the negative charge of interstitial anions to produce a stable structure. Interstitial anions hold the sheets apart, thereby establishing interstitial layers which are another of the identifying characteristics of clays. For example, in the anionic layered mixed double hydroxide composition known as hydrotalcite, carbonate ions act as interstitial ions to balance positively charged sheets containing divalent magnesium ions, trivalent aluminum ions and negative hydroxide ions. Layered compositions lacking the mixed double hydroxide structure generally perform less favorably as catalysts, or as precursors of catalysts.

In addition to naturally-occurring hydrotalcite, layered mixed double hydroxide compositions have been prepared synthetically. For example, U.S. Pat. No. 3,879,525, in the name of Miyata et al. describes composite metal hydroxides having layered structures which are prepared from water soluble inorganic salts of divalent metals. The compositions are said to be useful for catalytic purposes, absorbents, desiccants and the like.

Preparation of hydrotalcites is described in U.S. Pat. No. 3,539,306 in the name of Kumura et al. Their process comprises mixing an aluminum component such as an aluminum salt, with a magnesium component such as magnesium salt, in an aqueous medium in the presence of carbonate ions. In the patent Kumura et al. state that the aluminum component may be any member of the group consisting of aluminum hydroxide, basic aluminum carbonate, aluminum hydroxide-alkalicarbonate complex, aluminum amino acid salt, aluminum alcoholate, water-soluble aluminum salt and water-soluble aluminate. As the magnesium component, Kumura et al. recommend any member of the group consisting of magnesium oxide, magnesium hydroxide, magnesium carbonate and water-soluble magnesium salt. However, Kumura et al. report no distinction between salt-containing reactants and salt-free reactants.

U.S. Pat. No. 4,539,195 in the name of Schanz et al. describes a process for producing a basic magnesium aluminum hydroxycarbonate of the formula

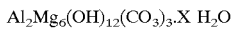

$$Al_2Mg_6(OH)_{12}(CO_3)_3 \cdot X\, H_2O$$

which includes conversion of aluminum hydroxide with basic magnesium carbonate and at least one other compound selected from magnesium hydroxide and magnesium oxide. The conversion is described as taking place at temperatures from about 50° C. to about 100° C., after which the resulting product purportedly can be spray dried without any intermediate filtration and washing processes. Schanz et al. state that the X-ray diffraction spectrum for the aluminum magnesium hydroxycarbonate is distinguishable from the spectrum generally associated with hydrotalcite. Significantly, the formula provided by Schanz et al. is not that of a layered mixed double hydroxide composition.

Preparation of hydrotalcite-type clays with more open galleries, generally known as pillared hydrotalcites, was described in U.S. Pat. No. 4,774,212 in the name of Drezdon. The patent states that anion-pillared hydrotalcite-type clays can be made by combining a magnesium salt, an aluminum salt, and an organic material intended as the inter-layer species in an aqueous solution. Reportedly, hydrotalcite having molybdate ions, tungstate ions, and vanadate ions as anionic pillars were prepared. A related procedure, was described in U.S. Pat. No. 4,843,168 in the name of Drezdon et al.

Traditional processes for manufacturing layered mixed double hydroxide compositions utilize metal salts in solution form as reactants. Such metal salt solutions contain dissociated metal cations which are easily dispersed and, therefore, well suited to formation of sheets in layered mixed double hydroxide compositions. However anions liberated by dissociation of metal salts form, generally, undesirable co-products which degrade the purity of the product compositions and/or necessitate additional separation processing for removal of co-products. Typically, complete removal of co-products requires as much as 100 parts by weight of wash water for each part by weight of finished composition. Washing and subsequent disposing of used wash water is burdensome.

U.S. Pat. No. 4,728,635 in name of Bhattacharyya et al. is directed to processes for production of a calcined alkaline earth, aluminum-containing spinel composition for use as a sulfur oxide removal agent. Their preparation procedures, including a procedure which produces a magnesium-rich, magnesium aluminum-containing spinel composition. In the procedure, an aqueous gel-containing slurry was formed by combining water, formic acid, pseudo-bohemite alumina and magnesia. The slurry was subsequently spray-dried and calcined to produce a relatively salt-free product. However, the proportions of the reactants utilized indicate that the product did not possess a layered structure.

U.S. Pat. No. 5,288,675, in the name of Kim, contemplates a $MgO/La_2O_3/Al_2O_3$ ternary oxide base wherein the MgO component is present as a micro-crystalline phase which may be detected by X-ray diffraction analysis. The ternary oxide base is said to be useful in combination with ingredients such as ceria and/or vanadia to control sulfur oxide emissions. Kim states that the combination can be prepared by a multi-step process which includes reacting an aged, co-precipitated lanthanum and aluminum hydrous oxide slurry with a magnesium oxide slurry and a sodium hydroxide solution, calcining, impregnating with solutions of cerium and/or vanadium and calcining at a temperature of 450° C. to 700° C.

U.S. Pat. No. 5,426,083 in the name of Bhattacharrya et al. and assigned to the assignee of the present invention describes an absorbent and process for removing sulfur oxides from a gaseous mixture, as well as processes for manufacturing the absorbent. The manufacturing processes described in the patent of Bhattacharrya et al. significantly advance the art and are entirely satisfactory for many purposes. However, the manufacturing processes recite blending divalent and trivalent metal salts as reagents. U.S. Pat. No. 5,426,083 is hereby incorporated by reference in its entirety, and particularly for its teachings regarding the preparation, use, calcination, and collapse of layered anionic mixed hydroxide compositions.

A salt is defined for the present purposes as any substance which spontaneously yields ions, other than hydronium or hydroxide ions, when immersed in water. Typically, salts are obtained by displacing the hydrogen of an acid by a metal. According to the definition, metal oxides, metal oxide hydroxides and metal hydroxides are not salts because these compounds spontaneously yield essentially no ions or, alternatively, yield hydroxide ions when immersed in water. Examples of salts under this definition are metal nitrates, metal chlorides, metal acetates, and metal carbonates.

Metal salts, both divalent and trivalent, are known to give rise to byproducts, such as nitrates, which are regarded as objectionable contaminants in some applications. Such byproducts have long been regarded as unavoidable, as previous practitioners apparently believed that aqueous dissociated metal salts were required to form the well ordered sheets characteristic of high quality clays. As a result, conventional processes for manufacturing layered mixed double hydroxide compositions often include tedious filtration and water washing steps to remove the byproducts. A process for preparing superior absorbents which does not include metal salts as reagents would be welcomed by practitioners who object to the presence of byproducts but who also wish to minimize or dispense with filtration and water washing for byproduct removal.

Although previously known methods are entirely satisfactory for many purposes, a need still exists for an improved manufacturing process which produces layered mixed hydroxide compositions from relatively salt-free reactants. Desirably, improved processes should produce less co-product which tend to degrade purity of product and necessitate disposal. More desirably, improved processes utilize reactants efficiently so that costs for salt-free reactants per unit of product are less than that for traditional processes which utilize salt-containing reactants. Improved manufacture of anionic, hydrotalcite-type pillared clay compositions by relatively salt-free methods which generate less spent wash water is especially welcome.

Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons.

Perhaps the most common commercial source of synthesis gas is the steam reforming of coal or a hydrocarbon, particularly natural gas. In the steam reforming process, a mixture of water and the hydrocarbon are contacted at a high temperature, for example, in the range of about 850° C. to about 900° C., and typically in the presence of a catalyst, to form a mixture of hydrogen and carbon monoxide. Using methane as the hydrocarbon, the theoretical stoichiometry for the steam reforming reaction is as follows:

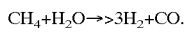

$$CH_4 + H_2O \rightarrow 3H_2 + CO.$$

In prior steam reforming processes, because of the large amount of steam typically necessary to reduce coke formation, the ratio of $H_2$ to CO produced is typically greater than 3:1 and can be 5:1.

The steam reforming reaction is a highly endothermic reaction, and, as discussed above, it produces a relatively high molar ratio of hydrogen to carbon monoxide when conventional processes are used. In some processes using synthesis gas, the excess hydrogen is not necessary and must be separated from the CO. For example, the manufacture of methanol or acetic acid from synthesis gas requires less than a 3:1 molar ratio of hydrogen to carbon monoxide.

There are other methods for preparing synthesis gas that are more attractive than the steam reforming reaction. Synthesis gas produced by the partial oxidation of methane, for example, is an exothermic reaction and produces synthesis gas having a lower ratio of hydrogen to carbon monoxide, according to the following equation:

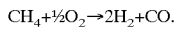

$$CH_4 + \tfrac{1}{2}O_2 \rightarrow 2H_2 + CO.$$

Synthesis gas can also be produced by the reaction of a hydrocarbyl compound such as methane with carbon dioxide. This reaction proceeds according to the following equation:

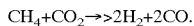

$$CH_4 + CO_2 \rightarrow 2H_2 + 2CO.$$

This reaction, like the steam reforming reaction, is endothermic; however, it produces a low ratio of hydrogen to carbon monoxide (1:1) and is very useful where there is an abundant supply of carbon dioxide, for example, at a refinery or near naturally-occurring $CO_2$ reserves. Additionally, the reforming reaction using carbon dioxide can also be used in conjunction with the steam reforming reaction to adjust the ratio of hydrogen to carbon monoxide.

In all of the hereinabove described processes for preparing synthesis gas, it is advantageous to conduct the reaction of the hydrocarbyl compound with the source of oxygen in the presence of a catalyst. For example, catalysts for the steam reforming of methane and other hydrocarbons are commonly based on nickel as the active catalyst component. Vernon et al. in Catalysis Letters, Vol. 6, pages 181–186, 1990, discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. While Vernon et al. discloses that nickel on alumina catalysts are effective for the conversion of methane to synthesis gas using molecular oxygen, we have determined that such a catalyst, as well as commercial nickel-containing steam reforming and steam cracking catalysts, form coke and deactivate relatively rapidly. While the other catalysts described in Vernon et al., such as ruthenium on alumina, can be used to reform a hydrocarbyl compound such as methane in the presence of molecular oxygen, such transition metals are expensive and the transition metal catalyst based on ruthenium we evaluated exhibited lower conversion and lower selectivity to synthesis gas compared to the catalysts of this invention. Ashcroft et al. in Nature, Volume 352, page 225, 1991, describes the reforming of methane with carbon dioxide to form synthesis gas using catalysts such as palladium, ruthenium and iridium on alumina, as well as nickel on alumina.

U.S. Pat. No. 3,791,993 to Rostrup-Nielsen discloses the preparation of catalysts containing nickel for reforming gaseous or vaporizable liquid hydrocarbons using steam, carbon oxide, oxygen and/or air. Catalysts disclosed therein are prepared by coprecipitating a nickel salt, a magnesium salt and an aluminate to form a sludge, washing the sludge until it is substantially free of sodium and potassium, drying, and then dehydrating at 300° C. to 750° C. The ultimate catalyst is formed after a calcination step at 850° C. to 1100° C. Examples in Rostrup-Nielsen show that compositions having a 1:1:2 or a 2:7:1 mole ratio of nickel, magnesium and aluminum, respectively, are suitable for converting naphtha to hydrogen-rich gaseous products using steam reforming.

In view of great commercial interest in preparing synthesis gas by reforming readily available hydrocarbon feedstocks such as natural gas, and because of the benefits of conducting these reforming reactions in the presence of a catalyst that remains active for an extended period of use, there is a continuing need for new, less expensive, durable, coke resistant, more active and selective catalysts for the production of synthesis gas. The present invention provides such catalysts as well as a method for preparing synthesis gas using such catalysts.

Catalysts useful in the process of this invention can be prepared from a nickel-containing catalyst precursor compound having a structure that is referred to as "hydrotalcite-like" and/or "hydrotalcite-like." Hydrotalcite compounds are anionic clays, both natural and synthetic, that have a layered or sheet-like structure. For example, hydrotalcite, a naturally occurring mineral, has the chemical composition $[Mg_6Al_2(OH)_{16}]CO_3.4H_2O$, and is composed of molecular "sheets", each sheet comprising a mixture of magnesium and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula for these hydrotalcite-type compounds is:

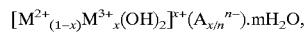
$[M^{2+}_{(1-x)}M^{3+}_x(OH)_2]^{x+}(A_{x/n}^{n-}).mH_2O,$ wherein x generally is a number between 0.1 and 0.50, $M^{2+}$ is a 2+ metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in Inorganic Chemistry, Volume 31, page 3869, 1992. Drezdzon, in Inorganic Chemistry, Volume 27, page 4628, 1988, discloses the synthesis of isopolymetalate-pillared hydrotalcites.

As described above, hydrotalcite-like compounds share the "sheet-like" structural characteristics, which is conveniently identified using x-ray powder diffraction (XRD) analyses. Hydrotalcite-like materials typically have a d(001) value of at least about 7.8 Å. Based on the size of the anion used, the hydrotalcite-like molecules can have d(001) values up to 15 Å. The d(001) value is indicative of the inter layer spacing present in the hydrotalcite-like materials.

Hydrotalcite-like compounds have been used as catalysts in a variety of applications, such as catalysts for aldol condensation, polymerization of alkene oxides, hydrogenation catalysts, dehydrogenation catalysts, etc., as described in F. Cavani et al., Catalysis Today, Volume 11, pages 173—301, 1991. Cavani et al. discloses that coprecipitated Ni, Al-based catalysts have been recognized as satisfying all the requirements for operation in steam reforming for methane production, and that coprecipitated catalysts calcined at 723° K. (450° C.) and reduced at 723° K. (450° C.) were active in the 673° C. to 923° K.(450° C. to 650° C.) range for steam cracking of naphtha to produce methane.

U.S. Pat. No. 3,865,753 to Broecker et al. discloses the use of a catalyst prepared by calcining $[Ni_5MgAl_2(OH)_{16}]CO_3.4H_2O$ at a temperature in the range of 350° C. to 550° C., and which is subsequently reduced with hydrogen. Such a catalyst was used for the steam cracking of hydrocarbons having 2 to 30 carbon atoms at a temperature in the range of 300° C. to 450° C. to form methane.

Ross et al., J. of Catalysis, Volume 52, pages 280–290, 1978, have examined the reaction of methane with water over a catalyst derived from $Ni_6Al_2(OH)_{16}CO_3.4H_2O$ at temperatures of 873° K. to 973° K. (600° C. to 700° C.). Kruissink et al., J. Chemical Society, Faraday Trans. I, Volume 77, 649–663, 1981, discusses the thermal treatment of nickel-containing compositions having x-ray patterns characteristic of the hydrotalcite-like minerals; and Hernandez et al., Thermochemica Acta, Volume 81, 311–318, 1984, investigated the thermal decomposition of hydrotalcite-like compounds of formula $[Ni_{1-x}Al_x(OH)_2]^{x+}X^{n-}_{x/n}.mH_2O$ where x is in the range of 0.25 to 0.33 and X is carbonate and sulfate. Using X-ray diffraction studies, these researchers identified nickel oxide as the decomposition product at temperatures above 600° C., whereas the corresponding spinel, $NiAl_2O_4$, was formed at temperatures higher than 1000° C.

British Patent No. 1,342,020 discloses catalysts having chemical composition $Ni_6Al_2CO_3(OH)_{16}.4H_2O$ and $Ni_3Mg_3Al_2CO_3(OH)_{16}.4H_2O$ and discloses that they have an application as hydrogenation, dealkylation and cracking catalysts. Clause et al, J. of Catalysis, Volume 133, 231–246 (1992) discloses the preparation and analysis of nickel-aluminum mixed oxides obtained by thermal decomposition of hydrotalcite-type precipitates. This paper also discloses that nickel-aluminum mixed oxides resulting from the thermal decomposition of hydrotalcite-like coprecipitates have been studied for steam reforming and methanation reactions.

SUMMARY OF THE INVENTION

The invention provides a process for manufacturing hydrotalcite-type pillared clay compositions from ractants which contain a relatively minor amount of metal salts or, preferably, contain essentially no metal salts. Use of relatively salt-free reactants gives rise to a lesser amount of co-products such as nitrates, which traditionally have been removed by filtering and water washing, and sent to disposal. Processes of the invention for manufacturing a dehydrated nickel-containing materials use sources of cations composed substantially of metal oxides, metal oxide hydroxides and metal hydroxides. In the processes, divalent metal compounds and trivalent metal compounds are blended with a compound capable of forming anions in a neutral or alkaline aqueous medium to produce a layered mixed double hydroxide composition.

In one aspect this invention is a process for manufacturing a dehydrated nickel-containing material which comprises:

A. Blending in an aqueous medium (i) about two molar parts of one or more divalent metal compound none of which is a salt and comprises $Ni^{2+}0$ ions, or $Ni^{2+}$ ions and another divalent metal ion selected from the group consisting of $Mg^2+$, $Zn^{2+}$ and $Cu^{2+}$ ions, and (ii) about one molar part of an aluminum compound which is not a salt, and (iii) about one-half to about one molar part of a water soluble interstitial anion precursor, to produce a mixture;

B. Heating the mixture to a temperature in a range of about 50° C. to about 100° C. and maintaining the mixture at elevated temperature for at least about one hour to form an anionic layered mixed hydroxide;

C. Recovering the anionic layered mixed hydroxide from the mixture;

D. Calcining the recovered layered mixed hydroxide for not less than about one hour at a temperature of about 450° C. or hotter, to produce a dehydrated material; and, optionally, E. Heat treating, to a temperature of at least about 700° C. under reforming conditions, the dehydrated material of step D to produce an at least partially collapsed composition suitable for use as a catalyst for reforming of a hydrocarbyl compound to prepare synthesis gas comprising a mixture of carbon monoxide and molecular hydrogen.

In one aspect this invention is a method for preparation of an improved nickel-containing catalyst composition comprising a mixture of (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions. Catalyst having this hybrid phase component are highly active in the reforming method of this invention. $M^{2+}$ in this hybrid phase is at least $Ni^{2+}$ and can be a mixture of $Ni^{2+}$ and some other metal ion, preferably at least one other metal having a valence of 2+.

High resolution electron microscopy reveals that a substantial portion of the microcrystallites are essentially composed of a solid solution having impurities, such as aluminum oxide, dispersed in a monoxide of a divalent metal. The improved catalyst also includes spinel microcrystallites and trivalent metal oxide microcrystallites. The manufacturing process utilizes reagents which contain a relatively minor amount of metal salts or, preferably, contain essentially no metal salts.

In another aspect the invention is a method for preparation of an anionic layered mixed hydroxide hydrotalcite-like composition having the formula:

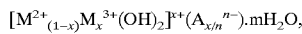

where $M^{2+}$ is a metal ion having a valence of 2+ and is at least $Ni^{2+}$ or preferably, a mixture of $Ni^{2+}$ and $Mg^{2+}$, optionally with one or more metals having a valence of 2+ and preferably selected from $Cu^{2+}$, $Co^{2+}$, $Zn^{2+}$, $Fe^{2+}$ or $Mn^{2+}$; $M^{3+}$ is a metal ion having a valence of 3+ and suitably selected from $Al^{3+}$, $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least $Al^{3+}$, optionally with one or more selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number of about 0.1 to about 0.50, wherein the value of x and (1−x) are obtained by combining all of the metal ions having a 3+ valence, and 2+ valence, respectively; $A^{n-}$ is an anion having a negative charge of n, and n can suitably be 1 to about 10; and m is 0 or a positive number. A mixture of anions can also be used In still another aspect, this invention is a process for preparing synthesis gas comprising feeding a gaseous or vaporizable hydrocarbyl compound and an oxygen-containing gas to a suitable reaction zone containing a catalyst formed by heat treating a nickel containing hydrotalcite-like compound, and reacting the hydrocarbyl compound and the oxygen-containing gas in the presence of the catalyst at a temperature and at a pressure sufficient to form synthesis gas.

In one aspect of the manufacturing process, water is blended with about two molar parts of a divalent metal compound which is not a salt and includes a divalent metal selected from the group consisting of nickel, magnesium, copper, cobalt, zinc, iron, and manganese. Additionally, one molar part in sum of an aluminum compound which is not a salt and a selected trivalent metal compound which is not a salt is also blended in the mixture. The trivalent metal compound contains a trivalent metal selected from the group consisting of gallium, nickel, cobalt, iron manganese, chromium, vanadium, titanium, lanthanum, and indium. A metalate salt in a quantity of about 0.01 to less than 2 molar parts is also blended into the mixture to act as a precursor for the above-described interstitial anions, or the interstitial anions may be entirely composed of carbonate. Alternatively, about one-half to about one molar part of a water soluble interstitial anion precursor such as sodium carbonate may be blended into the mixture to serve as a source of temporary interstitial anions, which are later eradicated by calcining and at least partially replaced by anions from a metalate salt.

If present, the metalate salt preferably contains an anionic species which is a vanadate, a tungstate, or a molybdate. In an especially preferred aspect, an alkalinity control agent is also blended into the mixture to stabilize the anion in an aqueous, dissociated form which contains but a single metal atom. Anions in such form are commonly described as mono-metalate. It is sometimes convenient to introduce the anions in solution form as a separate step after a precipitate has formed and has been calcined at least once.

The mixture is heated to a temperature in the range of about 50° C. to about 100° C. for at least about one hour and, thereafter, an anionic layered mixed hydroxide is recovered from the mixture. The recovered layered hydroxide is calcined for about one hour at a temperature of about 450° C. or hotter to produce a partially collapsed and dehydrated composition suitable for use as a catalyst for reforming of a hydrocarbyl compound to prepare synthesis gas comprising a mixture of carbon monoxide and molecular hydrogen.

BRIEF DESCRIPTION OF THE INVENTION

Figure 1:
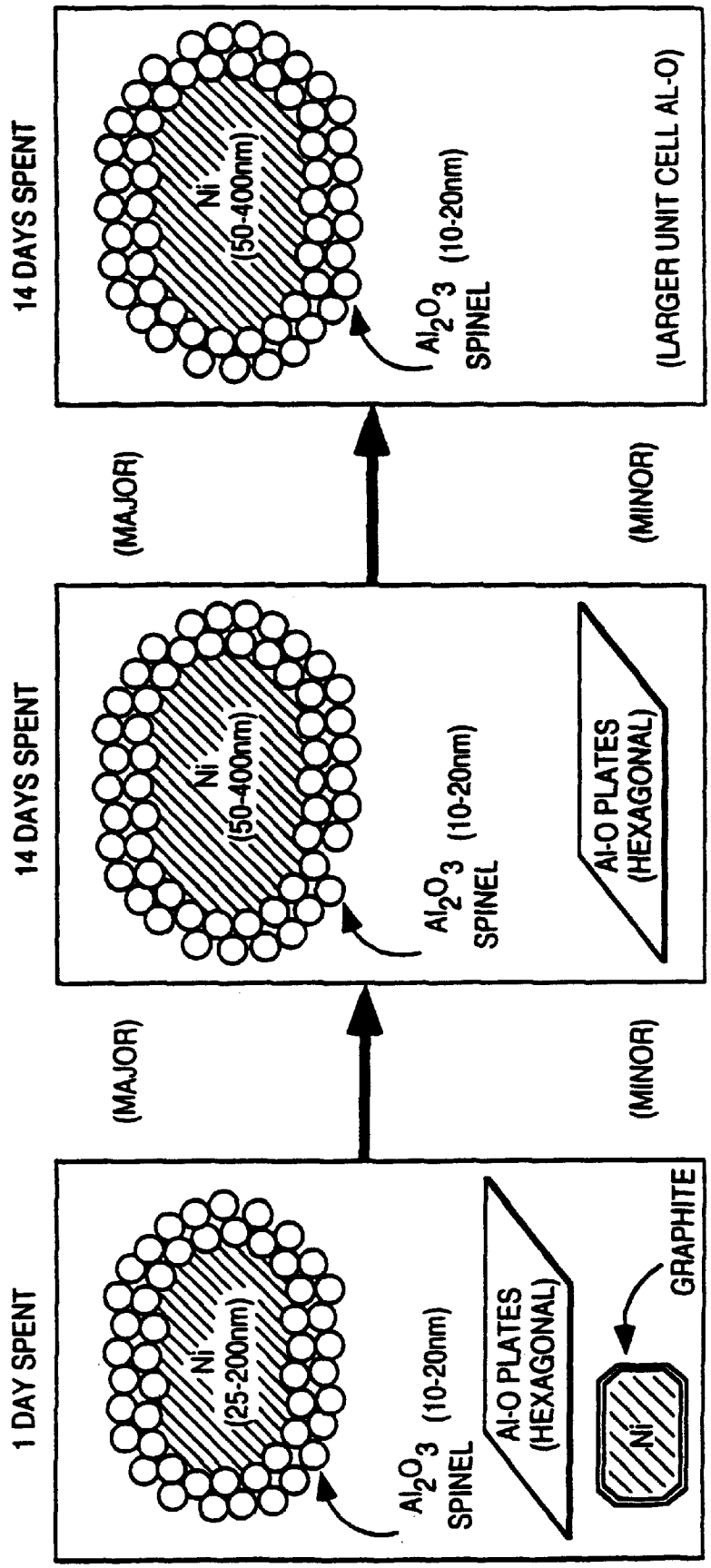
FIG. 1 is a schematic representation of the structure of the nickel-containing catalysts of this invention under reforming conditions.

The invention includes a method for manufacturing anionic layered mixed double hydroxide compositions which contain nickel from reactants which need not contain any metal salts and, therefore, tends to produce less undesirable byproducts which degrade purity and necessitate additional separation and disposal operations. Relatively salt-free reactants can be introduced into an aqueous medium as dissociated solutes or solid phase particles.

Anionic layered mixed compositions having the well-known double hydroxide structure are especially preferred precursors of adsorbents and catalysts. In the double hydroxide structure, divalent cations are octahedrally surrounded by hydroxide anions and the resulting octahedral edges form sheets which define interstitial spaces occupied by anions. The total change of the interstitial anions corresponds to the excess charge contributed by the trivalent cations, so that the layered structure as a whole is electrically neutral. Anionic layered mixed double hydroxide compositions are of the formula:

$$[M^{2+}_{(1-x)}M^{3+}_x(OH_2^{1-})]^{x+}(A_{x/n}^{n-}\cdot mH_2O,$$

wherein $M^{2+}$ is a metal ion having a valence of 2+ selected from the group consisting of divalent metals and mixtures thereof; $M^{3+}$ is at least one metal ion having a valence of 3+ and is at least $Al^{3+}$; x is a number greater than about 0.25 to about 0.50; $A^{n-}$ is an anion having a negative charge n; and m is 0 or a positive number.

It is believed that the double hydroxide structures provide relatively open interstitial spaces which are desirably accessible to adsorbates and reactants. Preferably, divalent cations and trivalent cations are present in the layered structure in the ratio of about one and a half to one to about three to one, so that the corresponding interstitial anions provide adequate mechanical stability for the layered structure without unnecessarily blocking the interstitial spaces. More preferably, the divalent and trivalent cations are present in the ratio of about one and one half to one to two and one half to one; most preferably, in the ratio of about two to one.

Anionic layered mixed double hydroxide compositions are layered in the sense that they are constituted by sheets of divalent and trivalent metal cations interposed between a larger number of hydroxide ions which are also in the sheets. They are mixed because divalent cations and trivalent cations are interspersed within the sheets., Unless driven off by heat treatment, interstitial anions and water molecules are located in interlayers between the sheets.

When subjected to conventional X-ray diffraction analysis, the layered mixed double hydroxide composition exhibits diffraction peaks whose positions can be correlated with the average distance between adjacent sheets. Within the sheets, the divalent metal is present as a cation having a valence of 2 coordinated with a plurality of hydroxide anions to form the sheets. The structure of the sheets resembles the structure of the naturally occurring mineral brucite, $Mg(OH)_2$.

By way of comparison, the naturally occurring mineral hydrotalcite is a specific example of an anionic layered mixed hydroxide composition. However, the formula of hydrotalcite differs from the formula of the layered composition of the present invention in that the mineral hydrotalcite ordinarily contains substantially no divalent metals other than magnesium, substantially no trivalent metals other than aluminum, and substantially no anions other than carbonate.

In a preferred aspect, the invention is a method for manufacturing an anionic layered mixed double hydroxide composition which comprises blending a source of divalent cations with a source of trivalent cations in an aqueous medium. Blending is understood to include any method wherein all of the described ingredients are blended simultaneously, and also to include methods wherein two or more ingredients are blended with each other and then blended with other ingredients. At each successive combination of ingredients, care must be taken to provide concentrations and alkalinities which tend to precipitate desired divalent metals and trivalent metals, as described above. Alkalinity of the mixture can also determine which forms of anions are stabilized in solution and ultimately become components of the precipitates.

Precursor streams contain metal compounds which are sources of metal cations in the anionic layered mixed double hydroxide composition. The sources themselves may be dissociated ions in an aqueous solution or, alternatively, undissociated cations participating in an ionic or covalent chemical bond. It is believed that a neutral or alkaline aqueous environment tends to promote the formation of the sheets of the layered double mixed hydroxide composition.

A divalent cation precursor stream includes a divalent metal compound which may be in the form of dissociated ions or undissociated ions. For example, divalent metal compounds may be present as solid particles in a sol or a slurry. If particles are present, it is preferred that the particles be finely divided to increase surface area and promote dispersion.

Preferably, divalent metal compounds are selected from the group consisting of divalent metal oxides, divalent metal hydroxides, and mixtures thereof. More preferably, a divalent metal compound is selected from the group consisting of nickel oxides, nickel hydroxides, magnesium oxides, magnesium hydroxides, copper oxides, copper hydroxides, zinc oxides, zinc hydroxides and mixtures thereof.

For convenience, we refer to solutions containing dissolved salts as salt solutions even though the ionic bonds of the salts have become dissociated. A salt is defined herein as any substance which spontaneously yields ions, other than hydronium or hydroxide ions, when immersed in water. Typically, salts are obtained by displacing the hydrogen of an acid by a metal. According to the definition, metal oxides, metal oxide hydroxides and metal hydroxides are not salts because these compounds spontaneously yield essentially no ions or, alternatively, yield hydroxide ions when immersed in water. Examples of salts under this definition are metal nitrates, metal chlorides, metal acetates, and metal carbonates.

Significantly, divalent metal salts are not a necessary ingredient of the divalent cation precursor stream. Although previous researchers apparently believed that aqueous dissociated metal salts were required to form the well ordered sheets characteristic of high quality clays, it has now been discovered that the above-described metal oxides and metal hydroxides can also serve as suitable cation precursors for layered mixed double hydroxide compositions. Moreover, metal salts, both divalent and trivalent, are known to give rise to objectionable byproducts which are regarded as contaminants in many layered mixed double hydroxide compositions. Accordingly, it is preferred that the divalent cation precursor stream contains a relatively minor proportion of divalent metal salts. It is especially preferred that the divalent cation precursor stream contains no metal salts.

A trivalent cation precursor stream includes a trivalent metal compound selected from the group consisting of trivalent metal oxides, trivalent metal oxide hydroxides, trivalent metal hydroxides, trivalent metal salts and mixtures thereof. Preferably, the trivalent metal oxide precursor stream includes no more than a relatively minor proportion of trivalent metal salts. More preferably, the trivalent metal cation precursor stream includes essentially no trivalent metal salts. It is especially preferred that both the divalent metal cation precursor stream and the trivalent cation precursor stream are essentially salt-free.

Preferably, the trivalent metal compound contains aluminum. It is especially preferred, that the trivalent compound is a mixture of an aluminum compound selected from the group consisting of aluminum oxides, aluminum oxide hydroxides, aluminum hydroxides and mixtures thereof.

The term trivalent metal oxide hydroxides is intended to encompass such compounds as alpha-aluminum oxide hydroxides, also known as alpha-alumina monohydrate or bohemite, and beta-aluminum oxide hydroxides, also known as beta-alumina monohydrate or diaspore. The term trivalent metal hydroxides is understood to include trivalent hydroxides such as gibbsite, bayerite and nordstrandite. For details on the naming of trivalent metal compounds, see Encyclopedia of Chemical Technoloav, Kirk-Othmer, 3rd Edition, Volume 2, 218–227.

The divalent and trivalent cation precursor streams are additionally blended with an interstitial ion precursor stream including a compound capable of forming an anion in the presence of an aqueous medium having a pH of 7 or more. It is contemplated that a substantial portion of the anion forming compound becomes dissociated and serves as a source of interstitial ions which eventually occupy the interlayers between sheets of the layered mixed hydroxides composition. Alternatively, the interstitial ion may be prepared in situ from the anion forming compound as, for example, in the case of boric acid being introduced into an aqueous phase having an alkalinity of about 8 pH to produce borate for use as an interstitial anion. The anion forming compound may contain any anion suitable for inclusion in a hydrotalcite-like structure and can be, for example, carbonate, nitrate, halide, chlorate, sulfite, sulfate, hydroxide, oxide, carboxylate, poly-carboxylates, phosphate, or various metalates. Preferably, the interstitial anion precursor is selected from the group consisting of carbonate, nitrate, chlorate, sulfite, sulfate, hydroxide, oxide, carboxylate, poly-carboxylates, phosphate, and metalates vanadate, tungstate, molybdtate, and borate. More, preferably, the interstitial anion precursor is selected from the group consisting of carbonate, nitrate, sulfite, sulfate, hydroxide, oxide, carboxylate, poly-carboxylates, phosphate, vanadate, tungstate, and molybdtate. Most preferably, the anion forming compound includes carbonates.

Blending of the three precursor streams described above gives rise to a combined charge stream. It is preferable that the combined stream have a continuous phase which is substantially composed of water. For example, it is preferred that the combined stream be an aqueous solution or, alternatively, an aqueous sol or aqueous slurry. To that end, a sufficient amount of an aqueous stream is blended with the precursor streams to produce a combined charge stream having a continuous phase which is substantially composed of water. However, when the precursor streams themselves provide a sufficient amount of water to produce a combined charge stream having a continuous phase substantially composed of water, there is no need to separately add the aqueous stream.

It is believed that a neutral or alkaline aqueous continuous phase promotes the formation of the layered structure from the precursors. In many cases, the continuous phase of the combined charge stream is neutral or alkaline as a result blending the precursor streams. In those cases, additional bases need not be blended into the combined charge stream, although their presence is not objectionable and is sometimes desirable, for example, to stabilize particular ionic forms as explained below. However, when the continuous phase would otherwise be acidic, it is highly recommended that a base be blended into the combined charge in amount sufficient to alkalinize the continuous phase to a pH of about 7 or more, preferably about 8 or more.

The combined stream is heated to a temperature of about 50° C. to about 100° C., more preferably about 75° C. to about 100° C., and maintained at a temperature within the specified range for at least about one hour. Higher temperatures may be utilized provided that commensurately higher pressures exist to preserve at least a portion of the mixture in the liquid phase.

Water washing may also be a part of the recovering process. Because the present process utilizes less salt-containing reactants and produces lesser amounts objectionable byproducts arising from salts, even when washing is used relatively less water washing is required to remove residual salts and byproducts. Reduction in water washing time and/or wash water volume are important advantages of the present invention in that relatively smaller amounts of reactants processes. Preferably when washing is used, the present process does not include washing one part by weight of the layered mixed double hydroxide composition with more than about fifty parts by weight of water; more preferably, not more than about twenty parts by weight of water; and, most preferably, not more than about ten parts by weight of water.

Thereafter, a layered mixed double hydroxide composition having a molar ratio of divalent metals to trivalent metals in the range of about one and one-half to about three; more preferably, about one and one-half to about two and one-half; and most preferably, about two is recovered from the combined stream. Appropriate recovery techniques include but are not limited to decanting, filtering, centrifuging, crystallizing, vaporizing and drying.

The anionic layered mixed double hydroxide composition may subsequently be calcined to drive out some or all of the interstitial anions and water of hydration molecules and, optionally, to promote phase changes. Preferably, the calcining is performed for about one hour or more at a temperature of at least about 350° C.; more preferably, at a temperature in the range of about 450° C. to about 800° C.; and, most preferably, at a temperature in the range of about 500° C. to about 700° C. The calcining may be performed repeatedly in two or more operations, optionally interspersed by contacting with an aqueous metalate solution. The final calcining may produce a dehydrated and collapsed composition which is used to catalyze hydrocarbon reactions.

A very significant advantage can be enjoyed at this stage if the interstitial anions being eradicated by calcining are $CO_3^{2-}$ anions, particularly if such carbonate anions are introduced to the mixture via sodium carbonate as the interstitial anion precursor. In that case, calcination off-gas produced as a byproduct of the anion eradication contains carbon dioxide rather than, for example, sulfuric acid or hydrogen chloride. Because the off-gas associated with sodium carbonate is relatively harmless to humans and the environment, sodium carbonate is the interstitial anion precursor of choice when interstitial anions which are essentially eradicated by calcining are desired.

Herein, calcining refers to the heating of a solid in the presence of a gas, preferably a flowing gas. The gas may be air or, alternatively, a relatively inert gas, such as nitrogen, helium, or carbon dioxide. As noted above, The final calcining produces a dehydrated and collapsed composition suitable for use, for example, as a catalyst in chemical conversion processess for making synthesis gas.

The collapsed composition is dehydrated in the sense that it contains essentially no associated water molecules. Additionally, the sheets containing metal cations coordinated with hydroxide anions, as described above, are at least partially disrupted by the calcining and are in a condition conveniently termed "collapsed." Rather than having sheets of 400 manometers or more in length as are typical of the layered mixed hydroxides, the collapsed composition is substantially composed of microcrystallites, each having a greatest linear dimension in the range of about 0.1 to about 30 manometers. It is hypothesized that the microcrystallites are disintegrated and jumbled remnants of the layered mixed hydroxides which are believed to have at least partially collapsed when subjected to the calcining. Repeated calcination steps interspersed by contact with aqueous solutions are believed to repeatedly disrupt and reform the layered sheets so as to produce a final collapsed product having an excellent degree of microcrystallite dispersion.

In any event, the microcrystallites of the invention are relatively small and well dispersed so as to be accessible to reactants such as gaseous or vaporizable hydrocarbyl compounds and oxygen-containing gases. A substantial portion of the microcrystallites are constituted by a solid solution phase having aluminum oxide dispersed in a divalent metal monoxide. Another portion is constituted by a spinel phase. The phases contain lattice planes discernible by high resolution electron microscopy.

Analysis by high resolution electron microscopy demonstrates that preferred compositions of the invention comprises (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions. More preferred are catalytic compositions wherein $M^{2+}$ is $Ni^{2+}$, and the crystallites are about 5 nanometers to about 400 nanometers in size.

In the practice of this invention the layered mixed double hydroxide composition or, alternatively, the collapsed composition can be incorporated into or deposited onto a suitable support. Suitable supports include, but are not limited to, amorphous cracking catalyst, zeolite-type cracking catalyst, silica, alumina, mixtures of silica and alumina, magnesia, mixtures of silica and magnesia, kieselguhr, kaolin and diatomaceous earth.

In yet another preferred aspect, the invention is a process for manufacturing a layered mixed double hydroxide composition which comprises blending a divalent cation precursor stream which includes essentially no divalent metal salts with a trivalent cation precursor stream which includes essentially no trivalent metal salts. The divalent cation precursor stream includes a divalent metal compound selected from the group consisting of divalent metal oxides, divalent metal hydroxides and mixtures thereof The trivalent cation precursor stream includes a trivalent metal compound selected from the group consisting of trivalent metal oxides, trivalent metal oxide hydroxides, trivalent metal hydroxides and mixtures thereof. Also blended are an interstitial ion precursor stream including a compound capable of forming an anion in the presence of an aqueous medium having a pH of 7 or more and sufficient amounts of an aqueous stream and a base to produce a combined charge stream having a neutral or alkaline continuous phase which is substantially composed of water.

As described above, the combined stream is maintained at a temperature in the range of about 50° C. to about 100° C. for at least about one hour. A layered mixed double hydroxide composition having a molar ration of divalent to trivalent metals in the range of about one and one-half to one to about three to one is recovered from the combined stream.

Catalytic materials of this invention for preparing synthesis gas are suitably prepared by heat treating a catalyst precursor composition comprising one or more hydrotalcite-like compounds comprising the formula:

$$[M^{2+}_{(1-x)}M_x^{3+}(OH)_2^{1-}]^{x+}(A_{x/n}^{n-}).mH_2O, \quad (1)$$

where $M^{2+}$ is $Ni^{2+}$ or a mixture of $Ni^{2+}$ and at least one other divalent metal ion selected from the group consisting of $Ca^{2+}$, $Cd^{2+}$, $Co^{2+}$, $Cu^{2+}$, $Fe^{2+}$, $Mg^{2+}$, $Mn^{2+}$, $Pd^{2+}$, $Pt^{2+}$, $Sr^{2+}$, $Ti^{2+}$, $V^{2+}$, $Zn^{2+}$ and $Zr^{2+}$ ions, preferably consisting of $Co^{2+}$, $Cu^{2+}$, $Fe^{2+}$, $Mg^{2+}$, $Mn^{2+}$, and $Zn^{2+}$ ions, more preferably consisting of $Mg^{2+}$, $Cu^{2+}$ and $Zn^{2+}$ ions, and most preferably $Mg^{2+}$ ions. The atomic ratio of $Ni^{2+}$ to other metal ion or ions present having a 2+ charge is suitably in the range of about 100:1 to about 0.05:1, preferably 5:1 to about 0.1:1.

$M^{3+}$ in the formula above is at least one metal ion having a valence of 3+ and is and preferably selected from $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$, $Ti^{3+}$, $V^{3+}$ and the trivalent lanthanum metal ions. Preferably $M^{3+}$ is at least $Al^{3+}$. When a mixture of $Al^{3+}$ and at least one other metal ion having a valence of 3+ are present, the atomic ratio of $Al^{3+}$ to the other $M^{3+}$ ion or ions present in suitably about 100:1 to about 0.05:1.

The anion, A, in the formula (1) above can be any anion that provides for a hydrotalcite-like structure and can be, for example, carbonate, nitrate, a halide (e.g. $Cl^-$, $Br^-$), chlorate, sulfate, hydroxide, oxide, carboxylates and polycarboxylates; particularly those having one to about 20 carbon atoms, including, for example, acetate, benzoate, the phthalates, and the like, phosphates, boron containing anions, metalates of metals from Group Vb of the Periodic Table of Elements, metalates of metals of Group VIb of the Periodic Table. Examples of borates and metalates include, $B(OH)_4^-$, $[B_3O_3(OH)_4]^-$, $[B_3O_3(OH)_5]^{2-}$, $[B_4O_5(OH)_4]^{2-}$, $V_2O_7^{4-}$, $HV_2O_7^{3-}$, $V_4O_{12}^{4-}$, $V_3O_9^{3-}$ and $V_{10}O_{28}^{6-}$. Examples of phosphates include $PO_4^{3-}$, $HPO_4^{2-}$ and $H_2PO_4^-$. Other anions that can be used include $Nb_6O_{19}^{8-}$, $HNb_6O_{19}^{7-}$, $H_2Nb_6O_{19}^{6-}$, $NbO_4^{3-}$, $Ta_6O_{19}^{8-}$, $HTa_6O_{19}^{7-}$, $TaO_4^{3-}$, $Mo_7O_{24}^{6-}$, $HW_6O_{21}^{5-}$, Keggin-type anions such as $PW_{11}O_{39}^{7-}$ and $SiW_{11}O_{38}^{7-}$ which are stable at a pH above above 6. The value x is about 0.1 to about 0.5, preferably 0.25 to about 0.45. The value n is suitably about 1 to about 10. The amount of water present in the hydrotalcite-like catalyst precursor is variable. The amount of water can be such that the value m in the formula above is about 0 to about 2.

For example, a hydrotalcite-like compound corresponding to $[Ni_{0.625}Cu_{0.125}Al_{0.25}(OH)_2](CO_3)_{0.125}.0.5H_2O$ is a suitable precursor compound for preparing an active catalyst for the reforming of methane according to the method of this invention. In this formula, Ni and Cu have a valence of 2+; Al has a valence of 3+; and x=0.25 and m is 0.5. However, it is more convenient to express this formula using whole numbers; therefore, if the fractional numbers are multiplied by 8, the same formula can be expressed as: $[Ni_5CuAl_2(OH)_{16}]CO_3.4H_2O$. Specific formulas for the hydrotalcite-like compounds are represented herein using whole numbers. Another example of a suitable hydrotalcite-like catalyst precursor compound is $[NiZnMg_2Al_2(OH)_{12}]Mo_2O_7.4H_2O$. In this compound, x=0.333, n=2, m=0.666, and the formula has been multiplied by 6 to convert the fractional numbers to whole numbers. Another example is a compound having formula $[Ni_4Zn_2Cu_2Mg_4Al_4(OH)_{32}]$ $V_4O_{12}.8H_2O$. In this formula, x=0.25, n=4, m=0.5, and it has been multiplied by 16 to convert the fractional numbers in the formula to whole numbers.

Preferred hydrotalcite-like catalyst precursor compounds useful in the method of this invention are those compounds having the formula (1) above where $M^{2+}$ is $Ni^{2+}$, a mixture of $Ni^{2+}$ and $Mg^{2+}$, a mixture of $Ni^{2+}$ and $Cu^{2+}$, a mixture of $Ni^{2+}$ and $Zn^{2+}$, or a mixture of $Ni^{2+}$, $Cu^{2+}$ and $Mg^{2+}$ and where $M^{3+}$ is $Al^{3+}$. In these preferred catalyst precursor compositions, wherein a mixture of nickel and magnesium and/or copper are used, the molar ratio of $Ni^{2+}$ to $Mg^{2+}$ and/or $Cu^{2+}$ is in the range of about 1:100 to about 100:1. Specific examples of preferred hydrotalcite-like catalyst precursor compounds are: $[Ni_8Al_2(OH)_{20}]CO_3 \cdot yH_2O$; $[Ni_6Al_2(OH)_{16}]CO_3 \cdot yH_2O$; $[Ni_5MgAl_2(OH)_{16}]CO_3 \cdot yH_2O$; $[Ni_4Mg_2Al_2(OH)_{16}]CO_3 \cdot yH_2O$; $[Ni_3Mg_3Al_2(OH)_{16}]CO_3 \cdot yH_2O$; $[Ni_2Mg_4Al_2(OH)_{16}]CO_3 \cdot yH_2O$; $[NiMg_5Al_2(OH)_{16}]CO_3 \cdot yH_2O$; $[Ni_4Al_2(OH)_{12}]CO_3 \cdot yH_2O$; $[Ni_3MgAl_2(OH)_{12}]CO_3 \cdot yH_2O$; $[Ni_2Mg_2Al_2(OH)_{12}]CO_3 \cdot yH_2O$; $[NiMg_3Al_2(OH)_{12}]CO_3 \cdot yH_2O$; $[Ni_{14}Al_6(OH)_{40}](CO_3)_3 \cdot yH_2O$; $[Ni_{12}Mg_2Al_6(OH)_{40}](CO_3)_3 \cdot yH_2O$; $[Ni_1Mg_{13}Al_6(OH)_{40}](CO_3)_3 \cdot yH_2O$; $[Ni_3Al_2(OH)_{10}]CO_3 \cdot yH_2O$; $[Ni_2MgAl_2(OH)_{10}]CO_3 \cdot yH_2O$; $[Ni_1Mg_2Al_2(OH)_{10}]CO_3 \cdot yH_2O$; $[Ni_2Al_2(OH)_8]CO_3 \cdot yH_2O$; $[NiMgAl_2(OH)_8]CO_3 \cdot yH_2O$; $[Ni_2MgCuAl_2(OH)_{12}]CO_3 \cdot yH_2O$, $Ni_2Cu_2Al_2(OH)_{12}CO_3 \cdot yH_2O$; and the like and where y in these formulas is 0–20.

A particularly preferred group of catalyst precursor compounds that are useful in the method of this invention are those hydrotalcite-like compounds having the formula (1) above where $M^{2+}$ is a mixture of $Ni^{2+}$ and $Mg^{2+}$, but can also contain one or more other metal ions having a 2+ valence, and preferably selected from $Cu^{2+}$, $Co^{2+}$, $Zn^{2+}$, $Fe^{2+}$ or $Mn^{2+}$; $M^{3+}$ is a metal ion having a valence of 3+ and is at least $Al^{3+}$, optionally with one or more other metal ion having a valence of 3+, and preferably selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number greater than about 0.25, more preferably greater than about 0.28 to about 0.50, more preferably to about 0.45; $A^{n-}$ is an anion, for example, as described above, having a negative charge n, and m is 0 or a positive number. Catalyst formed from these precursor compounds demonstrate higher activity and superior resistance to coke formation during the reforming reaction disclosed herein.

Another particularly preferred group of catalyst precursor compounds are those hydrotalcite-like compounds having formula (1) where $M^{2+}$ is at least, and preferably is, a mixture of $Ni^{2+}$ and $Cu^{2+}$, and where $M^{3+}$ is at least $Al^{3+}$ and preferably is $Al^{3+}$; where x is about 0.1 to about 0.5, preferably about 0.25 to about 0.45; A is an anion, preferably as discussed hereinabove, having negative charge n; and m is 0 or a positive number, preferably 0–2.

The hydrotalcite-like catalyst precursor compounds described herein are activated through heat treatment, i.e. they are thermally activated. The heat treatment is typically conducted by subjecting the hydrotalcite-like compound to a temperature of at least 700° C., more preferably at least about 800° C., for a time sufficient to convert the hydrotalcite-like catalyst precursor compound into an active catalyst for the reforming of hydrocarbyl compounds. This heating can be done prior to using the catalyst precursor for a reforming reaction, or it can be done in the reactor apparatus used for the reforming reaction, preferably under reforming conditions. For example, the temperature used for the reforming reactions are typically sufficiently high to activate the catalyst precursor compounds. During the heat treatment to form the active catalyst, the hydrotalcite-like compounds first lose water that is located between the hydroxide layers. This typically occurs at temperatures in the range of about 200° C. to about 250° C. This is a reversible reaction, however, since the dehydrated hydrotalcite-like compositions can be again hydrated to restore their original hydrotalcite-like structures. Upon heating to higher temperatures, for example, temperatures in excess of 450° C., another change occurs in the catalyst precursor where there is a loss of the anion, if it is volatile, or, for example, the anion loses water if it is not volatile. However, this transformation does not irreversibly destroy the layer structure of the hydrotalcite-like composition since a layer structure can be restored by replacing the anion or hydrating the anion. Upon heating to still higher temperatures, for example, temperatures in excess of about 700° C., there is an irreversible loss of layer structure, and these heat-activated compositions are the active catalysts for the reforming of hydrocarbyl compounds according to the method of this invention.

We have determined that when the nickel-containing hydrotalcite-like catalyst precursor compounds disclosed herein are heated or thermally-activated at temperatures of at least about 700° C., preferably in the range of about 800° C. to about 1050° C., a new hybrid phase component is formed. Evaluation of heat treated $[Ni_4Al_2(OH)_{12}CO_3] \cdot 4H_2O$ and $[Ni_2Mg_2Al_2(OH)_{12}CO_3 \cdot 4H_2O$ compounds by High Resolution Transmission Electron Microscopy showed that the heat-treated samples contain a new hybrid phase comprising a mixture of NiO or NiO/MgO, and $NiAl_2O_4$ spinel or $NiAl_2O_4/MgAl_2O_4$ spinel or $Ni/MgAl_2O_4$ spinel in the same crystallite, wherein the NiO or NiO/MgO phase and the spinel phase are joined in the same crystallite by an epitaxial interface. By epitaxial interface, we mean an area in a single crystallite where, between two distinct crystalline species in the same crystallite, the two crystalline species coexit and yet form a well defined interface. Catalyst compositions containing this hybrid phase are highly active in the reforming method of this invention. Thus, this invention is a catalyst composition comprising a hybrid catalyst component comprising a $M^{2+}O$ component and a $M^{2+}Al_2O_4$ spinel component in the same catalyst crystallite, wherein the $M^{2+}O$ component of the crystallite and the $M^{2+}Al_2O_4$ component of the crystallite are joined through an epitaxial interface. $M^{2+}$ in this hybrid catalyst component is at least $Ni^{2+}$ and can be $Ni^{2+}$ and some other metal ion, preferably having a valence of 2+, and preferably selected from $Mg^{2+}$, $Cu^{2+}$, $Co^{2+}$, $Zn^{2+}$, $Fe^{2+}$ or $Mn^{2+}$. These crystallites comprising the hybrid phase are typically about 5 to about 400 nm in size, preferably about 5 nm to about 100 nm in size. This catalyst composition comprising the hybrid phase can be prepared by heating one or more of the herein described nickel-containing hydrotalcite-like precursor compounds to a temperature in the range of about 800° C. to about 1050° C., and preferably by heating a nickel-containing hydrotalcite-like catalyst precursor compound wherein the $M^{2+}$ metal ion in the formula $[M^{2+}_{(1-x)}M^{3+}_x(OH)_2]^{x+}(A_{x/n}{}^{n-}) \cdot mH_2O$ is at least $Ni^{2+}$ or preferably a mixture of $Ni^{2+}$ and $Mg^{2+}$, and wherein $M^{3+}$ is at least $Al^{3+}$.

The preferred catalyst compositions of this invention for preparing synthesis gas are those compositions formed by heat treating one or more hydrotalcite-like compounds having the formula:

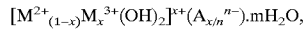

$$[M^{2+}_{(1-x)}M_x^{3+}(OH)_2]^{x+}(A_{x/n}{}^{n-}) \cdot mH_2O,$$

where $M^{2+}$ is a metal ion with a valence of 2+ and is at least $Ni^{2+}$ or, preferably, a mixture of $Ni^{2+}$ and $Mg^{2+}$, optionally with one or more metal ions having a valence of 2+ and preferably selected from $Cu^{2+}$, $Co^{2+}$, $Zn^{2+}$, $Fe^{2+}$ or $Mn^{2+}$, more preferably selected from $Cu^{2+}$ or $Zn^{2+}$; where $M^{3+}$ is a metal ion having a valence of 3+ and is suitably selected from at least one of $Al^{3+}$, $Ga^{3+}$, $Ni^{3+}$, $CO^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least $Al^{3+}$ optionally with one or more selected from the $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3}+$, and, most preferably, $M^{3+}$, is $Al^{3+}$; where x is a number of about 0.1 to about 0.50, preferably 0.25 to about 0.45, wherein the value x and (1−x) are obtained by combining all of the metal ions having a 3+ valence, and 2+ valence, respectively, where the anion $A^{n-}$ is an anion having a negative charge of n and is an anion that provides for a hydrotalcite-like structure, and is suitably selected from carbonate, nitrate, a halide, sulfate, chlorate, hydroxide, oxide, carboxylate, phosphates, boron containing anions, Group Vb and Vlb metalates, and the like, and, preferably, A is carbonate; and where the value of m is 0 or a positive number, preferably 0 to about 2. Particularly, preferred catalyst compositions are those herein above described hydrotalcite-like compounds that have been exposed to the reactants and reaction conditions used for the preparation of synthesis gas by the reaction of a hydrocarbyl compound with molecular oxygen, or by the reaction of a hydrocarbyl compound with carbon dioxide.

A preferred group of anions useful in the hydrotalcite-like compounds used to make catalysts is the group consisting of molybdates and polyoxomolybdates, for example $Mo_7O_{24}^{6-}$, $MoO_4^{2-}$, $MoO^{4-}$, and the like. These molybdates and polyoxomolybdates are preferred because they will impart coke reducing capability to the catalyst composition of this invention.

The hydrotalcite-like precursor compounds used in the method of this invention can be prepared by using procedures known in the art. However, one procedure for preparing these hydrotalcite-like compounds comprises combining in solution, preferably in aqueous solution, a nickel 2+ compound, optionally with one or more of the other metal ions discussed hereinabove having a 2+ valence, with one or more metal ions as described hereinabove having a 3+ valence. Suitable metal compounds are the nitrates, chlorides, sulfates, and the like. The solution containing the 2+ and 3+ metal ion is combined with a solution of the desired anion, A, or a precursor to the anion. For example, A may be $CO_3^{2-}$, $SO_4^{2-}$, $Cl^-$, etc. An anion precursor is a compound which produces the desired anion under the reaction conditions used to prepare the hydrotalcite-like compound. For example, $NaVO_3$ is a precursor to the anion $V_2O_7^{4-}$ because, at a reaction mixture pH of 10–11, $NaVO_3$ yields $V_2O_7^{4-}$. The pH dependent behavior of some transition element metalates is described in Kepert, D. L., "The Early Transition Metals," Academic Press, London (1972).

Additionally, the pH of the reaction mixture used to form the hydrotalcite-like precipitate should be such that all of the M2+ and M3+ ions selected for a particular hydrotalcite-like composition are incorporated in the coprecipitate. The table presented below shows the approximate pH ranges in which hydrotalcite-like compounds are formed for a selection of metal ions.

| Divalent Metal Ion | Trivalent Metal Ion | Approximate pH Range |
| --- | --- | --- |
| $Mg^{2+}$ | $Al^{3+}, Fe^{3+}, Cr^{3+}, Bi^{3+}, Mn^{3+}, Co^{3+}$ | 8 to 12–14 |
| $Cu^{2+}$ | $Al^{3+}, Fe^{3+}, Cr^{3+}, Bi^{3+}, Mn^{3+}, Co^{3+}$ | 6 to 12–13 |
| $Co^{2+}$ | $Al^{3+}, Fe^{3+}, Cr^{3+}, Bi^{3+}, Mn^{3+}, Co^{3+}$ | 8 to 12–13 |
| $Zn^{2+}$ | $Al^{3+}, Fe^{3+}, Cr^{3+}, Bi^{3+}, Mn^{3+}, Co^{3+}$ | 7 to 10–11 |
| $Ni^{2+}$ | $Al^{3+}, Fe^{3+}, Cr^{3+}, Bi^{3+}, Mn^{3+}, Co^{3+}$ | 6 to 12–13 |
| $Mn^{2+}$ | $Al^{3+}, Fe^{3+}, Cr^{3+}, Bi^{3+}, Mn^{3+}, Co^{3+}$ | 9 to 12–14 |
| $Fe^{2+}$ | $Al^{3+}, Fe^{3+}, Cr^{3+}, Bi^{3+}, Mn^{3+}, Co^{3+}$ | 7 to 12–14 |

For example, in order to prepare a nickel/aluminum hydrotalcite-like compound having a carbonate anion, the nickel and aluminum salt are combined in water and then added to a carbonate containing solution. From the table above, the approximate pH range to produce the hydrotalcite-like compound is about 6–12. Similarly, if a copper-nickel-aluminum containing hydrotalcite-like compound is desired, the pH range needs to be 6 to 12. If the desired anion, $A^{n-}$, is not stable at this pH range, then the hydrotalcite-like structures will not form. If the pH of the reaction mixture used to form the hydrotalcite-like compound requires adjustment, a base such as ammonium hydroxide, an alkali metal hydroxide or a tetralkylammonium hydroxide can be used. If an acid is required to adjust the pH, a mineral acid such as nitric acid or hydrochloric acid can be used. Also, after the proper pH has been achieved, the solution generally requires heating for a period of time, preferably at a temperature of about 40 to 90° C., to accelerate the formation of the hydrotalcite-like precipitate, which can be collected by filtration.

The molar ratio of the 2+ metal ions to 3+ metal ions is preferably about 9:1 to about 1:1. The mole ratio of the anion used to the total of 2+ and 3+ metal ions depends on the charge on the anion to be incorporated. For each metal ion with a 3+ valence, a corresponding negative charge in the anion layer of the hydrotalcite-like compound is required. Generally, a molar excess of anion is used during the preparation of the hydrotalcite-like compound in order to ensure complete reaction.

The 2+ metal ion and 3+ metal ion compounds are optimally mixed together and added slowly, with stirring, to a warmed solution of the anion. As stated above, the resulting solution must have the proper pH. Slower addition and a more elevated temperature (a pressure vessel can be used) tends to produce a product with larger crystals.

Commonly assigned U.S. Pat. No. 5,246,899 and U.S. Pat. No. 5,354,932, to Bhattacharyya et al., also disclose preparation of hydrotalcite-like compounds, and the specification of which patents are specifically incorporated herein in their entirety by reference.

In the preferred reforming method of this invention, a vaporizable hydrocarbyl compound and an oxygen containing gas comprising molecular oxygen or carbon dioxide are fed to a suitable reaction zone, which zone contains a catalyst formed by heat treating one or more of the nickel-containing hydrotalcite-like compounds described hereinabove, and reacting the hydrocarbyl compound and the oxygen-containing gas in the presence of the reforming catalyst at reaction conditions sufficient to produce synthesis gas in the form of a mixture of molecular hydrogen and carbon monoxide. The mole ratio of hydrogen to carbon monoxide may vary, however, it is suitably in the range of about 0.1:1 to about 5:1.

The hydrocarbyl compound used in the method of this invention suitably comprises one or more gaseous or vaporizable compounds that can be reacted with molecular oxygen or carbon dioxide to form synthesis gas. Most suitably, the hydrocarbyl compound is a hydrocarbon, however, various amounts of oxygen or other atoms can also be in the hydrocarbyl molecule. For example, hydrocarbyl compounds that can be converted to synthesis gas include methanol, dimethylether, ethylene oxide, and the like. However, the most preferable hydrocarbyl compounds are the low molecular weight hydrocarbons containing about 1 to about 20 carbons, more preferably 1 to about 10 carbon atoms. Methane and natural gas, which is mainly methane, are readily available, inexpensive, and are the most preferred hydrocarbyl feed materials for the method of this invention. Mixtures of hydrocarbyl and/or hydrocarbon compounds can also be used.

The oxygen-containing gas used in the method of this invention preferably is either a gas comprising molecular oxygen or a gas comprising carbon dioxide. The gas comprising molecular oxygen is used in the method of this invention for preparing synthesis gas by the oxidation of the hydrocarbyl compound to synthesis gas. When methane is the hydrocarbyl compound, this reaction proceeds according to the partial-oxidation reaction described in the following equation:

$$CH_4 + \tfrac{1}{2}O_2 \rightarrow CO + 2H_2.$$

The oxygen-containing gas used in the method of this invention can be pure molecular oxygen or a mixture of molecular oxygen with one or more other gases such as nitrogen, helium, or some other inert gas. Air is a suitable source of molecular oxygen. The molecular oxygen can be in the oxygen-containing gas at a level of about 1% to about 100%, preferably about 20 to about 100%, most preferably the molecular oxygen containing gas is substantially pure, e.g. 98%, or pure, e.g. + 99% molecular oxygen.

The amount of molecular oxygen relative to the hydrocarbyl compound fed to the reactor containing the catalyst derived from the nickel-containing hydrotalcite-like catalyst precursor is such that there is sufficient oxygen to form synthesis gas. When methane is used the molar ratio of molecular oxygen to methane in the feed compound added to the reaction zone is about 1:2. However, when high selectivity to synthesis gas is desired, the ratio of molecular oxygen to methane is about 1:2.1, and when complete methane conversion is desired, the optimal ratio of molecular oxygen to methane is about 1:1.9.

In the method of this invention wherein a hydrocarbyl compound is reacted with molecular oxygen to form synthesis gas, the reaction temperature is suitably in the range of about 400 to about 1000° C., more preferably about 600 to about 900° C. Additionally, since the reaction of the hydrocarbyl compound with molecular oxygen is exothermic, the heat produced by the process can be used as an energy source to operate other processes in a chemical manufacturing plant. For example, it can be used to generate high pressure steam. The pressure for the reaction of a hydrocarbyl compound with molecular oxygen is suitably in the range of about 0.1 atmospheres absolute to about 50 atmospheres absolute, preferably about 25 atmospheres absolute to about 40 atmospheres absolute. The space velocity is suitably that which provides for the conversion of a major portion of the hydrocarbyl feed to synthesis gas, and preferably the volumetric space velocity is in the range of about 10 hr$^{-1}$ to about 1×10$^9$ hr$^{-1}$, more preferably about 1200 hr$^{-1}$ to about 1×10$^6$ hr$^{-1}$. The volumetric space velocity being calculated based on the total volume of reactant gases, i.e. the gaseous hydrocarbyl feed component and the molecular-oxygen containing gas component, and the volume of the catalyst in the reactor.

Although other feed materials can be added along with the molecular oxygen-containing gas and the hydrocarbyl feed compound, for example, water or steam, it is generally not necessary to do so. One of the advantages of the method of this invention wherein a hydrocarbyl compound is converted to synthesis gas by reaction with molecular oxygen, is that the nickel-containing catalysts derived from the hydrotalcite-like catalyst precursor compounds are very resistant to coke formation. Therefore, it is not essential to add steam or water to eliminate coking of the catalyst. However, steam or water can be added in order to adjust the ratio of H$_2$ to CO in the synthesis gas product.

In the method of this invention wherein a gas comprising carbon dioxide is reacted with a hydrocarbyl compound, the gas comprising carbon dioxide is suitably about 1 percent to about 100 percent carbon dioxide, more preferably about 20 percent to about 100 percent carbon dioxide, and most preferably it is substantially pure carbon dioxide. The gas comprising carbon dioxide can contain other gases, for example, nitrogen, helium, argon and the like, however, as stated above, it is preferable to use substantially pure carbon dioxide.

In the method of this invention wherein hydrocarbyl compounds are reformed to synthesis gas using carbon dioxide, the addition of water or steam is beneficial to reduce the coking of the catalyst. The amount of steam present should be an amount sufficient to control the formation and deposition of coke on the catalyst so that deactivation does not occur. Preferably, the amount of water in the form of steam is suitably about 10 to about 50 percent of the feed gases, more preferably about 20 to about 30 percent of the total feed gas. Other materials can be added to the total feed gasses to promote the longevity of the catalyst. For example, hydrogen sulfide, or other source of sulfur, preferably a volatile source of sulfur, can be added along with the feed gas to the carbon dioxide reforming reaction. If used, hydrogen sul fide or other volatile sulfur-containing compound, e.g. an alkyl thiol, dialkyl sulfide or dialkyl disulfide, is present in the feed at a level of about 10 parts per million by weight to about 100 parts per million by weight, based on the total feed gas. However, we have determined that the catalysts of this invention are effective for reforming hydrocarbyl compounds without the use of a sulfur-containing compound in the feed gas.

The amount of carbon dioxide relative to the hydrocarbyl compound fed to the reactor containing the catalyst derived from the nickel-containing, hydrotalcite-like catalyst precursor is such that there is sufficient carbon dioxide to effectively convert the hydrocarbyl compound to synthesis gas. Suitably, the molar ratio of carbon dioxide to carbon in the hydrocarbyl feed compound is at least about 0.8:1, preferably about 1:1 to about 5:1, most preferably about 1:1 to about 2:1.

The reaction temperature for the reforming of a hydrocarbyl compound using carbon dioxide is suitably in the range of about 750° C. to about 950° C., more preferably about 850° C. to about 900° C. The pressure for the reaction of the hydrocarbyl compound with carbon dioxide is suitably in the range of about 0.1 atmosphere absolute to about 50 atmospheres absolute, more preferably about 10 atmospheres absolute to about 35 atmospheres absolute. The space velocity for this reaction is suitably that which provides for the conversion of a major portion of the hydrocarbyl compound, preferably methane, to synthesis gas. Suitable volumetric space velocities are in the range of about 1000 hr$^{-1}$ to about 1×10$^6$ hr$^{-1}$, more preferably about 1×10$^4$ hr$^{-1}$. to about 1×10$^5$ hr$^{-1}$. The volumetric space velocity being calculated based on the total volume of gas entering the reactor containing the catalyst and the volume of the catalyst.

The nickel-containing compounds described herein prepared by heat treating the nickel-containing hydrotalcite-like compounds can also be used for the steam reforming of a hydrocarbyl compound where water is the oxygen-containing gas. Preferably the hydrocarbyl compound is methane or natural gas. The reaction temperature for the steam reforming reaction is suitably at least about 700° C. and is preferably in the range of about 800° C. to about 1000° C. The pressure is suitably at least about 0.1 to about 75 atmosphere absolute. The space velocity of the feed gas for the steam reforming reaction is suitably that which provides for the conversion of the major portion of the hydrocarbyl compound to synthesis gas. Suitable volumetric space velocities are in the range of about 1000 hr$^{-1}$ to about 1×10$^6$ hr$^{-1}$, preferably about 1×10$^4$ hr$^{-1}$ to about 1×10$^5$ hr$^{-1}$. The volumetric space velocity being calculated based on the total volume of gas entering the reactor containing the catalyst and the volume of the catalyst. The mole ratio of water-to-carbon in the feed gas is suitably about 10:1 to about 2:1; preferably about 8:1 to about 3:1. However, an advantage of the catalysts of this invention is that they do not readily form coke. Consequently, molar ratios of water (steam) to carbon in the hydrocarbyl portion of the feed can be low; for example, less than about 2:1, more preferably less than about 1.6:1, most preferably about 1:1. Preferably, the mole ratio of water to carbon in the feed gas is at least about 0.5:1. The ability to use low molar ratios of water to carbon is desirable because the synthesis gas product has a low ratio of hydrogen-to-carbon monoxide.

The active reforming catalysts of this invention formed during the reforming reaction described herein comprises metal particles comprising at least nickel metal (nickel in the zero oxidation state) and optionally containing one or more metals selected from Cu, Pd, and Pt in the zero oxidation state, and/or Co, Fe, Mn, and Zn in a reduced oxidation state which is stable under operating conditions. The zero oxidation state metal particles are mostly, more preferably substantially, and most preferably completely surrounded by crystallites having a spinel structure. The spinel crystallites comprise either $M^{3+}{}_2O_3$ and/or $M^{2+}M_2{}^{3+}O_4$ where $M^{2+}$ is a metal in the 2+ oxidation state and is preferably at least one of $Mg^{2+}$, $Zn^{2+}$, $Ni^{2+}$, $Fe^{2+}$, $Cu^{2+}$, $Co^{2+}$, $Mn^{2+}$, $Pd^{2+}$ or $Pt^{2+}$, and $M^{3+}$ is a metal in the +3 oxidation state and is preferably at least one of $Al^{3+}$, $B^{3+}$, $Cr^{3+}$, $Fe^{3+}$, $Ga^{3+}$, $In^{3+}$, $La^{3+}$, $Ni^{3+}$, $CO^{3+}$, $Mn^{3-}$, $Rh^{3+}$, $Ti^{3+}$, $V^{3+}$ ions. Most preferably, the $M^{3}+$ in the spinels is $Al^{3+}$ and most preferably $M^{2+}$, if present, is $Mg^{2+}$. The metal particles are suitably in the range of about 1 to about 1000 nanometers (nm) in size, preferably about 10 to about 500 nm in size. The atomic ratio of nickel to other metals, if present, in the metal particles is suitably in the range of about 100:1 to about 0.05:1, preferably about 5:1 to about 0.1:1. The spinel crystallites are suitably no more than about 200 nm in size, preferably no more than about 60 nm in size. Most preferably, the spinel crystallites are about 5 nm to about 30 nm in size. The mole ratio of the metals in the zero oxidation state to the spinel in the active reforming catalyst is typically about 20:1 to about 1:20. As used in this description of the spinel crystallites surrounding the active reforming catalyst, "mostly" means, on average, at least 50 percent of the exterior surface area of the metal particles; "substantially" means, on average, at least 80 percent of the exterior surface area of the metal particles; and "completely" means, on average, about 95 percent to about 100 percent of the surface area of the metal particles. As used in this description of the active reforming catalyst, "crystallite" means small crystals. Spinels are well-known crystal structures and are described, for example, in A. F. Wells', "Structural Inorganic Chemistry," Claredon Press, Oxford, 1987. The active reforming catalyst is most suitably prepared by treating, under reforming reaction conditions as described herein, the nickel-containing hydrotalcite-like compositions described herein.

The type of reactor used in the method of this invention is any type reactor that can be used to conduct a gas phase reaction over a heterogeneous, solid catalyst. For example, a fixed bed reactor, a fluidized bed reactor and the like.

The catalyst compositions described herein above can be used as such, or they can be supported on one or more inert support materials such as alpha alumina, silica, and the like. Preferably the catalyst composition, either supported or unsupported, are formed into shapes that are suitable for use in gas-phase reaction vessels, e.g. spheres, cylinders, rings, etc.

DETAILED DESCRIPTION OF THE FIGURE

FIG. 1 depicts, in schematic form, the structure of the nickel-containing catalysts of this invention during use as a $CO_2$ reforming catalyst. The schematic represents the results of actual analyses using electron microscopy. The catalyst after one day comprises nickel metal particles typically about 25 nm to about 200 nm in size. The nickel particles show some evidence of coke; i.e., about 1 in 20 nickel particles exhibits a very minor coating of graphitic carbon. The particles exhibiting the slight coating of graphitic carbon are typically those particles that are not surrounded by spinel crystallites. Nickel particles are decorated with alumina spinel crystallites. The catalyst after one day also contains a minor amount of hexagonal plates of aluminum oxide. After 5 days of catalyst use, the nickel particles have increased somewhat in size to about 50 nm to about 400 nm. However, coking of the nickel particles actually diminished. Thus, the catalyst demonstrated a surprising resistivity to coke formation. After 14 days on stream, coke formation was still low as with the 5-day catalyst. Nickel particles remained about 50 nm to about 400 nm in size. The catalyst also contained a minor amount of hexagonal plates of aluminum oxide. The unique structure of the catalyst, wherein the nickel particles are decorated with the alumina spinel, appears to contribute to the low coking of the nickel metal sites.

The following examples are being presented to illustrate certain embodiments of the invention disclosed herein; however, they should not be construed as limiting the scope thereof.

EXAMPLES OF THE INVENTION

Example 1

A 1 L, 3-neck round bottom flask equipped with a thermometer, reflux condenser, and mechanical stirrer was charged with 400 mL deionized water, 7.95 g (0.075 mol) of $Na_2CO_3$, and 24.0 g (0.6 mol) of NaOH pellets. A second solution containing 10.91 g (0.0375 mol) of $Ni(NO_3)_2 \cdot 6H_2O$, 48.08 g (0.1875 mol) of $Mg(NO_3)_2 \cdot 6H_2O$ and 28.14 g (0.075 mol) of $Al(NO_3)_3 \cdot 9H_2O$, and 375 mL of water was prepared and added dropwise to the first solution while stirring for a period of about 1 hour. After addition was complete, the gelatinous mixture (pH=8.9) was heated for about 15 hours at 80–85° C. The cooled mixture was filtered, washed repeatedly with water, and dried overnight under vacuum at 70° C. The XRD of the material showed a typical hydrotalcite-like structure having an interlayer spacing, widely termed a d(003) value, of approximately 7.6 Angstroms. This material corresponds to the formulation $[NiMg_5Al_2(OH)_{16})CO_3 \cdot 4H_2O$.

Example 2

The material described in Example 1 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 3

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 10.91 g (0.0375 mol) of $Ni(NO3)_2 \cdot 6H_2O$, 28.85 g (0.1125 mol) of $Mg(NO_3)_2 \cdot 6H_2O$ and 28.14 g (0.075 mol) of $Al(NO_3)_3 \cdot 9H_2O$, and 375 mL of water was prepared and added dropwise to the first solution while stirring for a period of about 1 h. The rest of the preparation was similar to Example 1. This material corresponds to the formulation $NiMg_3Al_2(OH)_{12} CO_3 \cdot 4H_2O$.

Example 4

The material described in example 3 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 5

A 1 L, 3-neck round bottom flask equipped with a thermometer, reflux condenser, and mechanical stirrer was charged with 400 mL deionized water, 10.6 g (0.1 mol) of $Na_2CO_3$, and 24.0 g (0.6 mol) of NaOH pellets. A second solution containing 29.08 g (0.1 mol) of $Ni(NO_3)_2 \cdot 6H_2O$, 25.64 g (0.1 mol) of $Mg(NO_3)_2 \cdot 6H_2O$ and 37.51 g (0.1 mol) of $Al(NO_3)_3 \cdot 9H_2O$, and 375 mL of water was prepared and added dropwise to the first solution while stirring for a period of about 1 hour. After addition was complete, the gelatinous mixture (pH=8.5) was heated for about 15 hours at 80–85° C. The cooled mixture was then filtered, washed repeatedly with water, and dried overnight under vacuum at 70° C. The XRD of the material showed a typical hydrotalcite-like structure with d(001) value of 7.6 Angstroms. This material corresponds to the formulation $[Ni_2Mg_2Al_2OH_{12}]CO_3 \cdot 4H_2O$.

Example 6

The material described in example 5 was calcined by placing a weighed amount of the material in a calciner and raising the temperature at 20° C./min. until a temperature of 450° C. to 500° C. was reached. The material was kept at that temperature for about 15 hours and then sieved to 12–20 mesh. This material was further calcined at 850° C. The XRD pattern of this catalyst shows only weak peaks due to NiO.

Example 7

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 43.62 g (0.15 mol) of $Ni(NO_3)_2 \cdot 6H_2O$ and 28.13 g (0.075 mol) of $Al(NO_3)_3 \cdot 9H_2O$, and 375 mL of water was prepared and added dropwise to the first solution while stirring for a period of about 1 hour. After addition was complete, the gelatinous mixture was heated for about 15 hours at 80–85° C. The cooled mixture was then filtered, washed repeatedly with water, and dried overnight under vacuum at 70° C. The XRD of the material shows typical hydrotalcite-like structure with d(001) value of 7.6 Angstroms. This material corresponds to the formulation $[Ni_4Al_2(OH)_{12}CO_3 \cdot 4H_2O]$.

Example 8

The material described in Example 7 was calcined by placing a weighed amount of the material in a calciner and raising the temperature at 20° C./min. until a temperature of 450° C. to 500° C. was reached. The material was kept at that temperature for about 15 hours and then sieved to 12–20 mesh. The XRD pattern of this material shows some weak peaks due to NiO. Further calcination of this material up to a temperature of about 850° C. did not change the nature of this material as evident from the XRD.

Example 9

A 1 L, 3-neck round bottom flask equipped with a thermometer, reflux condenser, and mechanical stirrer was charged with 400 mL deionized water, 5.30 g (0.05 mol) of $Na_2CO_3$, and 18.0 g (0.45 mol) of NaOH pellets. A second solution containing 43.62 g (0.15 mol) of $Ni(NO_3)_2 \cdot 6H_2O$ and 18.76 g (0.05 mol) of $Al(NO_3)_3 \cdot 9H_2O$, and 375 mL of water was prepared and added dropwise to the first solution while stirring for a period of about 1 hour. After addition was complete, the gelatinous mixture (pH=8.2) was heated for about 15 hours at 80–85° C. The cooled mixture was then filtered, washed repeatedly with water, and dried overnight under vacuum at 70° C. The XRD of the material showed a typical hydrotalcite-like structure with d(001) value of about 7.9 Angstroms. This material corresponds to the formulation $Ni_6Al_2(OH)_{16}CO_3 \cdot 4H_2O$ Example 10

The material described in Example 9 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 11

A synthesis very similar to that of Example 9 was performed with the exception that the amount of $Ni(NO_3)_2 \cdot 6H_2O$ used was 0.2 moles instead of 0.15 moles. This material corresponds to the formulation $Ni_8Al_2(OH)_{20}$—$CO_3 \cdot yH_2O$.

Example 12

The material described in example 11 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 13

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 21.81 g (0.075 mol) of $Ni(NO_3)_2 \cdot 6H_2O$, 17.44 g (0.075 mol) of $Cu(NO_3)_2 \cdot 6H_2O$ and 28.14 g (0.075 mol) of $Al(NO_3)_3 \cdot 9H_2O$, and 375 mL of water was prepared and added dropwise to the first solution while stirring for a period of about 1 hour. After addition was complete, the gelatinous mixture (pH=8.6) was heated for about 15 hours at 80–85° C. The cooled mixture was then filtered, washed repeatedly with water, and dried overnight under vacuum at 70° C. The XRD of the material showed a typical hydrotalcite-like structure with d(001) value of 7.5 Angstroms. The material corresponds to the formulation $Cu_2Ni_2Al_2(OH)_{12}CO_3 \cdot 4H_2O$

Example 14

The material described in example 13 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 15

A 1 L, 3-neck round bottom flask equipped with a thermometer, reflux condenser, and mechanical stirrer was charged with 400 mL deionized water and 19.8 g (0.495 mol) of NaOH pellets. A second solution containing 31.99 g (0.11 mol) of $Ni(NO_3)_2 \cdot 6H_2O$, and 41.27 g (0.11 mol) of $Al(NO_3)_3 \cdot 9H_2O$, and 340 mL of water was prepared and added dropwise to the first solution while stirring for a period of about 1 hour. At this point the pH of the mixture was 9.3. After addition was complete, the gelatinous mixture was heated for about 15 hours at 80–85° C. The cooled mixture was then filtered, washed repeatedly with water, and dried overnight under vacuum at 700° C. The XRDof the material does not show typical hydrotalcite-like structure. This product was calcined at 700° C. to yield high NiO spinel, $Ni_2Al_2O_5$.

Example 16

A 1 L, 3-neck round bottom flask equipped with a thermometer, reflux condenser, and mechanical stirrer was charged with 400 mL deionized water and 22.4 g (0.56 mol) of NaOH pellets. A second solution containing 20.37 g (0.07 mol) of $Ni(NO_3)_2 \cdot 6H_2O$, and 52.53 g (0.14 mol) of $Al(NO_3)_3 \cdot 9H_2O$, and 340 mL of water was prepared and added dropwise to the first solution while stirring for a period of about 1 hour. At this point the pH of the mixture was 10.3. A few drops of $HNO_3$ were added to reduce the pH to 9.5. After addition was complete, the gelatinous mixture was heated for about 15 hours at 80–85° C. The cooled mixture was filtered, washed repeatedly with water, and dried overnight under vacuum at 70° C. The XRDof the material did not show typical hydrotalcite-like structure. This product was calcined at 800° C. to yield the spinel, $NiAl_2O_4$.

Example 17

A Ni-based commercial catalyst was sieved to 40/60 mesh and used.

Example 18

A Ni-based commercial catalyst, different from Example 17, was sieved to 40/60 mesh and used.

Example 19

A 0.5 L, 3-neck round bottom flask equipped with a thermometer, reflux condenser, and mechanical stirrer was charged with 200 mL deionized water, 10.6 g (0.075 mol) of $Na_2CO_3$, and 28.0 g (0.7 mol) of NaOH pellets. A second solution containing 51.3 g of $Mg(NO_3)_2 \cdot 6H_2O$, 37.5 g of $Al(NO_3)_3 \cdot 9H_2O$, and 160 mL of water was prepared and added dropwise to the first solution while stirring for a period of about 1 hour. After addition was complete, the gelatinous mixture was heated for about 15 hours at 80–85° C. The cooled mixture was then filtered, washed repeatedly with water, and dried overnight under vacuum at 70° C. The XRD of the material shows typical hydrotalcite-like structure with d(001) value of 7.6 Angstroms.

Example 20

The material described in example 19 was calcined by placing a weighed amount of the material in a calciner and raising the temperature at 20° C./min. until a temperature of 450° C. to 500° C. was reached. The material was kept at that temperature for about 15 hours and then sieved to different mesh sizes. These sized materials were further calcined at 850° C.

Example 21

The catalyst prepared or described in the above examples were evaluated for the formation of synthesis gas by the partial oxidation of methane. The evaluations were conducted using an apparatus consisting of a 12 inch by 16 mm diameter quartz reactor tube mounted vertically in a 3-zone furnace. Each zone was 2 inches. Positioned in the center of the reactor tube was a 4 mm diameter quartz tube. Typically 4 mL of catalyst was loaded in the quartz reactor tube and, using quartz wool plugs, the catalyst bed was positioned in the central heating zone of the furnace. Three thermocouples were located inside the 4 mm tube: one at the top, middle and bottom of the catalyst bed. The feed gas for the evaluation was a mixture of 7.5 percent oxygen ($O_2$) and 15 percent methane in nitrogen. The nitrogen maintained the mixture outside of the explosive envelope and it also served as an internal standard for the analysis of the product mixture by gas chromatography. The methane to synthesis gas evaluations were conducted at near atmospheric pressure and the hereinabove described testing apparatus was designed to shut off automatically when the pressure exceeded about 30 inches of water. The chromatographic analysis was done automatically at intervals of 20–30 hours. The tables that follow do not report all of the analytical data obtained, rather they show representative data taken early, in the middle, and at the end of the evaluation.

Hydrogen formation was analyzed by gas chromatography, and helium was used as the carrier gas (a thermal conductivity detector was used). Consequently, the values reported in the tables for hydrogen are within a range of about 10 percent. Additionally, the selectivities reported for hydrogen are greater than 100 percen because two moles of hydrogen are theoretically possible for each mole of methane converted to synthesis gas by partial oxidation using molecular oxygen. Reaction temperature, flow rates, space velocity, residence time were as reported in the tables for each run.

Tables 1–8 show the results for the preparation of synthesis gas by the oxidation of methane using the catalysts of this invention. Specifically, Tables 1 and 2 show results using a catalyst derived from a hydrotalcite-like compound having formula: $NiMg_5Al_2(OH)_{16}CO_3$ and prepared according to Example 2. Table 3 shows the results using a catalyst derived from a hydrotalcite-like compound having formula: $NiMg_3Al_2(OH)_{12}CO_3$ and prepared according to Example 4. Table 4 shows the results using a catalyst derived from a hydrotalcite-like compound having formula: $Ni_2Mg_2Al_2(OH)_{12}CO_3$ and prepared according to Example 6. These data show that the catalysts containing nickel, magnesium and aluminum prepared from the hydrotalcite-like precursors all have excellent catalytic activity for the conversion of methane to synthesis gas by partial oxidation did not coke during the entire period tested.

Tables 5–7 show data for the preparation of synthesis gas using catalysts derived from $Ni_4Al_2(OH)_{12}CO_3$; $Ni_6Al_2(OH)_{16}CO_3$; and $Ni_8Al_2(OH)_{20}CO_3$ compounds prepared according to Examples 8, 10 and 12, respectively. These data show that the catalyst derived from the $Ni_4Al_2(OH)_{12}CO_3$ hydrotalcite-like precursor is an excellent catalyst for preparing syngas by the partial oxidation of methane. The other two catalysts, which were also active, did not maintain their activity as the other catalysts derived from hydrotalcite-like compounds. Table 8 shows data for a catalyst prepared in Example 14 from a $Cu_2Ni_2Al_2(OH)_{12}CO_3$ hydrotalcite-like compound. This catalyst is also an excellent catalyst for the preparation of synthesis gas from methane and oxygen.

Tables 9–12 shows data for the conversion of methane to synthesis gas using other nickel containing materials. Table 9 shows data for the catalyst described in Example 15, a spinel. While synthesis gas production was initially excellent, the spinel catalyst deactivated after 16 hours of use. Table 10 shows the data for a $NiO/Al_2O_3$ catalyst prepared according to Example 16. This catalyst gave poor conversion of methane to synthesis gas compared to the catalysts of this invention. Table 11 shows the data for a commercially available nickel-on-alumina catalyst (Example 17). While syngas production was initially excellent, deactivation occurred after only 55 hours on stream. Table 12 shows the data for another commercial nickel-containing catalyst that has been used for steam reforming of hydrocarbons. When used as a catalyst for the partial oxidation of methane, it initially demonstrated excellent conversion to synthesis gas, however, it deactivated rapidly after 26 hours of use.

Table 13 shows data for the preparation of synthesis gas using a catalyst derived from a hydrotalcite-like compound having formula $Mg_4Al_2(OH)_{12}CO_3$ and prepared according to Example 20. These data demonstrate that the catalyst prepared from a hydrotalcite-like composition containing magnesium and aluminum but no nickel is not as selective a catalyst for preparing synthesis gas by the partial oxidation of methane as the catalysts derived from hydrotalcite-like compounds that do not contain nickel.

TABLE 1

Partial Oxidation of Methane Using Catalyst Derived from $NiMg_5Al_2(OH)_{16}CO_3$

| | HOURS ON STREAM | | | |
|---|---|---|---|---|
| | 6:25 | 55:17 | 202:06 | 275:25 |
| Conditions[a] | | | | |
| Temp. ° C. | 752.1 | 750.1 | 749.9 | 750.0 |
| Conversions: | | | | |
| $CH_4$, mol %[b] | 94.88 | 94.09 | 95.00 | 94.90 |
| $O_2$ | 99.74 | 99.76 | 99.73 | 99.73 |
| Selectivities, mol % | | | | |
| $H_2$ | 169.61 | 169.21 | 172.03 | 166.54 |
| CO | 97.40 | 97.55 | 96.95 | 96.65 |
| $CO_2$ | 2.60 | 2.45 | 3.05 | 3.35 |
| $H_2/CO$ | 1.74 | 1.74 | 1.77 | 1.72 |

[a]Catalyst volume = 4.0 ml. Feed gas flow rate = 101.6 ml./min., Space velocity = $1.52 \times 10^3$ hr$^{-1}$, Weight hourly space velocity = $2.39 \times 10^3$ ml.g./hr., Residence time = 0.252 sec.
[b]Conversion based on the difference between the amount of methane added to the reactor and the amount of methane recovered.

TABLE 2

Partial Oxidation of Methane Using Catalyst Derived from $NiMg_5Al_2(OH)_{16}CO_3$

| Hours on Stream | 6:24 | 177:22 | 275:07 | 348:3 |
|---|---|---|---|---|
| Conditions[a] | | | | |
| Temp. ° C. | 750 | 750 | 750 | 750 |
| Conversions: | | | | |
| $CH_4$, mol %[b] | 94.99 | 93.49 | 93.56 | 94.9 |
| $O_2$ | 100.00 | 100.00 | 100.00 | 100.00 |
| Selectives, mol % | | | | |
| $H_2$ | 164.27 | 169.60 | 164.59 | 167.62 |
| CO | 96.72 | 98.29 | 97.41 | 97.08 |
| $CO_2$ | 3.28 | 1.71 | 2.59 | 2.92 |
| $H_2/CO$ | 1.70 | 1.72 | 1.69 | 1.70 |

[a]Catalyst volume = 4.0 ml. Feed gas flow rate = 101.6 ml./min., Space velocity = $1.52 \times 10^3$ hr$^{-1}$, Weight hourly space velocity = $2.39 \times 10^3$ ml.g./hr., Residence time = 0.252 sec.
[b]Conversion based on the difference between the amount of methane added to the reactor and the amount of methane recovered.

TABLE 3

Partial Oxidation of Methane Using Catalyst Derived from $NiMg_3Al_2(OH)_{12}CO_3$

| HOURS ON STREAM | 15:24 | 137:31 | 235:14 | 333:04 |
|---|---|---|---|---|
| Conditions[a] | | | | |
| Temp. ° C. | 750 | 750 | 750 | 750 |
| Conversions: | | | | |
| $CH_4$, mol %[b] | 95.88 | 94.51 | 94.47 | 95.74 |
| $O_2$ | 99.73 | 100.00 | 100.00 | 100.00 |
| Selectives, mol % | | | | |
| $H_2$ | 163.98 | 170.25 | 169.22 | 165.66 |
| CO | 97.27 | 97.91 | 97.79 | 97.44 |
| $CO_2$ | 2.73 | 2.09 | 2.21 | 2.50 |
| $H_2/CO$ | 1.69 | 1.74 | 1.73 | 1.61 |

[a]Catalyst volume = 3.5 ml. Feed gas flow rate = 102.1 ml./min., Space velocity = $1.75 \times 10^3$ hr$^{-1}$, Weight hourly space velocity = $6.96 \times 10^3$ ml.g./hr., Residence time = 0.220 sec.
[b]Conversion based on the difference between the amount of methane added to the reactor and the amount of methane recovered.

TABLE 4

Partial Oxidation of Methane Using Catalyst Derived from $Ni_2Mg_2Al_2(OH)_{12}CO_3$

| HOURS ON STREAM | 6:28 | 24:48 | 220:27 | 251:01 |
|---|---|---|---|---|
| Conditions[a] | | | | |
| Temp. ° C. | 800.0 | 800.0 | 800.0 | 800.1 |
| Conversions: | | | | |
| $CH_4$, mol %[b] | 97.56 | 97.46 | 97.54 | 97.53 |
| $O_2$ | 100.00 | 100.00 | 100.00 | 100.00 |
| Selectives, mol % | | | | |
| $H_2$ | 162.44 | 160.15 | 164.30 | 162.00 |
| CO | 98.96 | 99.02 | 99.17 | 99.02 |
| $CO_2$ | 1.04 | 0.98 | 0.83 | 0.98 |
| $H_2/CO$ | 1.64 | 1.62 | 1.66 | 1.64 |

[a]Catalyst volume = 3.0 ml. Feed gas flow rate = 100.6 ml./min., Space velocity = $2.01 \times 10^3$ hr$^{-1}$, Weight hourly space velocity = $3.80 \times 10^3$ ml.g./hr., Residence time = 0.182 sec.
[b]Conversion based on the difference between the amount of methane added to the reactor and the amount of methane recovered.

TABLE 5

Partial Oxidation of Methane Using Catalyst Derived from $Ni_4Al_2(OH)_{12}CO_3$

| HOURS ON STREAM | 19:53 | 68:47 | 215:35 | 264:28 |
|---|---|---|---|---|
| Conditions[a] | | | | |
| Temp. °C. | 751.0 | 748.9 | 752.3 | 747.5 |
| Conversions: | | | | |
| $CH_4$, mol %[b] | 94.64 | 94.37 | 95.59 | 95.57 |
| $O_2$ | 99.67 | 99.64 | 99.68 | 99.71 |
| Selectives, mol % | | | | |
| $H_2$ | 172.17 | 168.44 | 165.90 | 162.33 |
| CO | 97.53 | 97.73 | 97.02 | 97.08 |
| $CO_2$ | 2.47 | 2.27 | 2.98 | 2.92 |
| $H_2/CO$ | 1.77 | 1.73 | 1.71 | 1.67 |

[a]Catalyst volume = 4.0 ml. Feed gas flow rate = 102 ± 0.4 ml./min., Space velocity = 1.53 × 10³ hr⁻¹, Weight hourly space velocity = 3.06 × 10³ ml.g./hr., Residence time = 0.252 sec.
[b]Conversion based on the difference between the amount of methane added to the reactor and the amount of methane recovered.

TABLE 6

Partial Oxidation of Methane Using Catalyst Derived from $Ni_6Al_2(OH)_{16}CO_3$

| HOURS ON STREAM | 10:54 | 59:44 | 84:10 | 108:37[c] |
|---|---|---|---|---|
| Conditions[a] | | | | |
| Temp. °C. | 750 | 750 | 750 | 750 |
| Conversions: | | | | |
| $CH_4$, mol %[b] | 95.33 | 95.26 | 94.56 | — |
| $O_2$ | 100.00 | 100.00 | 100.00 | — |
| Selectives, mol % | | | | |
| $H_2$ | 161.52 | 163.76 | 170.05 | — |
| CO | 96.89 | 97.19 | 97.86 | — |
| $CO_2$ | 3.11 | 2.81 | 2.14 | — |
| $H_2/CO$ | 1.67 | 1.68 | 1.74 | — |

[a]Catalyst volume = 3.5 ml. Feed gas flow rate = 101.1 ml./min., Space velocity = 1.73 × 10³ hr⁻¹, Weight hourly space velocity = 2.33 × 10³ ml.g./hr., Residence time = 0.22 sec.
[b]Conversion based on the difference between the amount of methane added to the reactor and the amount of methane recovered.
[c]The reactor shut down due to excessive pressure drop caused by coking of catalyst.

TABLE 7

Partial Oxidation of Methane Using Catalyst Derived from $Ni_8Al_2(OH)_{20}CO_3$

| HOURS ON STREAM | 1:54 | 99:37 | 148:26 | 172:50[c] |
|---|---|---|---|---|
| Conditions[a] | | | | |
| Temp. °C. | 750.1 | 749.9 | 750 | 750 |
| Conversions: | | | | |
| $CH_4$, mol %[b] | 95.70 | 94.26 | 94.46 | — |
| $O_2$ | 99.75 | 100.00 | 100.00 | — |
| Selectives, mol % | | | | |
| $H_2$ | 163.57 | 169.38 | 172.23 | — |
| CO | 97.19 | 98.15 | 97.45 | — |
| $CO_2$ | 2.81 | 1.85 | 2.55 | — |
| $H_2/CO$ | 1.68 | 1.73 | 1.77 | — |

[a]Catalyst volume = 3.5 ml. Feed gas flow rate = 100.8 ml./min., Space velocity = 1.73 × 10³ hr⁻¹, Weight hourly space velocity = 3.18 × 10³ ml.g./hr., Residence time = 0.222 sec.
[b]Conversion based on the difference between the amount of methane added to the reactor and the amount of methane recovered.
[c]The reactor shut down due to excessive pressure drop caused by coking of catalyst.

TABLE 8

Partial Oxidation of Methane Using Catalyst Derived from $Cu_2Ni_2Al_2(OH)_{12}CO_3$

| HOURS ON STREAM | 10:54 | 59:40 | 132:47 | 157:10 |
|---|---|---|---|---|
| Conditions[a] | | | | |
| Temp. °C. | 750 | 750 | 750 | 750 |
| Conversions: | | | | |
| $CH_4$, mol %[b] | 95.12 | 95.42 | 95.61 | 95.56 |
| $O_2$ | 100.00 | 100.00 | 100.00 | 100.00 |
| Selectives, mol % | | | | |
| $H_2$ | 172.42 | 172.45 | 169.72 | 165.16 |
| CO | 97.44 | 97.52 | 98.23 | 98.59 |
| $CO_2$ | 2.56 | 2.48 | 1.77 | 1.41 |
| $H_2/CO$ | 1.77 | 1.77 | 1.73 | 1.67 |

[a]Catalyst volume = 4.0 ml. Feed gas flow rate = 101.9 ml./min., Space velocity = 1.52 × 10³ hr⁻¹, Weight hourly space velocity = 1.65 × 10³ ml.g./hr., Residence time = 0.254 sec.
[b]Conversion based on the difference between the amount of methane added to the reactor and the amount of methane recovered.

TABLE 9

Partial Oxidation of Methane Using $Ni_2Al_2O_5$
(Catalyst Derived from a NiAl Double Hydroxide)

| HOURS ON STREAM | 15:23 | 88:31 | 161:39 | 186:00[c] |
|---|---|---|---|---|
| Conditions[a] | | | | |
| Temp. °C. | 750 | 750 | 750 | 750 |
| Conversions: | | | | |
| $CH_4$, mol %[b] | 95.33 | 95.59 | 95.82 | — |
| $O_2$ | 100.00 | 100.00 | 100.00 | — |
| Selectives, mol % | | | | |
| $H_2$ | 160.83 | 164.66 | 155.01 | — |
| CO | 97.20 | 97.35 | 97.08 | — |
| $CO_2$ | 2.80 | 2.65 | 2.92 | — |
| $H_2/CO$ | 1.65 | 1.69 | 1.60 | — |

[a]Catalyst volume = 4.0 ml. Feed gas flow rate = 101.6 ml./min., Space velocity = 1.52 × 10³ hr⁻¹, Weight hourly space velocity = 1.65 × 10³ ml.g./hr., Residence time = 0.252 sec.
[b]Conversion based on the difference between the amount of methane added to the reactor and the amount of methane recovered.
[c]The reactor shut down due to excessive pressure drop caused by coking of catalyst.

TABLE 10

Partial Oxidation of Methane Using NiO/Al$_2$O$_3$

| HOURS ON STREAM | 117:22 | 141:45 | 190:31 |
|---|---|---|---|
| Conditions[a] | | | |
| Temp. ° C. | 752.7 | 751.3 | 751.0 |
| Conversions: | | | |
| CH$_4$, mol %[b] | 53.87 | 58.82 | 58.47 |
| O$_2$ | 100.00 | 100.00 | 100.00 |
| Selectivities, mol % | | | |
| H$_2$ | 105.27 | 126.23 | 124.23 |
| CO | 77.84 | 82.35 | 86.56 |
| CO$_2$ | 22.16 | 17.65 | 13.44 |
| H$_2$/CO | 1.35 | 1.53 | 1.43 |

[a]Catalyst volume = 2.0 ml. Feed gas flow rate = 101.6 ml./min., Space velocity = 3.05 × 10$^3$ hr$^{-1}$, Weight hourly space velocity = 2.34 × 10$^3$ ml.g./hr., Residence time = 0.126 sec.
[b]Conversion based on the difference between the amount of methane added to the reactor and the amount of methane recovered.

TABLE 11

Partial Oxidation of Methane Using a Commercial Nickel-Containing Catalyst

| HOURS ON STREAM | 6:26 | 30:48 | 55:11 | 79:34[c] |
|---|---|---|---|---|
| Conditions[a] | | | | |
| Temp. ° C. | 748.9 | 749.3 | 749.3 | — |
| Conversions: | | | | |
| CH$_4$, mol %[b] | 95.67 | 95.51 | 95.56 | — |
| O$_2$ | 100.00 | 99.70 | 99.45 | — |
| Selectives, mol % | | | | |
| H$_2$ | 172.26 | 170.79 | 174.03 | — |
| CO | 96.48 | 96.52 | 96.73 | — |
| CO$_2$ | 3.52 | 3.48 | 3.27 | — |
| H$_2$/CO | 1.78 | 1.77 | 1.80 | — |

[a]Catalyst volume = 4.0 ml. Feed gas flow rate = 101.1 ml./min., Space velocity = 1.52 × 10$^3$ hr$^{-1}$, Weight hourly space velocity = 1.77 × 10$^3$ ml.g./hr., Residence time = 0.254 sec.
[b]Conversion based on the difference between the amount of methane added to the reactor and the amount of methane recovered.
[c]Reactor shut down due to excessive pressure drop caused by coking of catalyst.

TABLE 12

Partial Oxidation of Methane Using A Commercial Nickel-Containing Catalyst

| HOURS ON STREAM | 1:55 | 26:20 | 50:47[c] |
|---|---|---|---|
| Conditions[a] | | | |
| Temp. ° C. | 750.0 | 750.0 | 26.3 |
| Conversions | | | |
| CH$_4$, mol %[b] | 94.95 | 94.97 | — |
| O$_2$ | 99.76 | 99.76 | — |
| Selectivities, mol % | | | |
| H$_2$ | 171.70 | 172.65 | — |
| CO | 97.39 | 97.38 | — |
| CO$_2$ | 2.61 | 2.62 | — |
| H$_2$/CO | 1.76 | 1.77 | — |

[a]Catalyst volume = 4.0 ml. Feed gas flow rate = 100.6 ml./min., Space velocity = 1.51 × 10$^3$ hr$^{-1}$, Weight hourly space velocity = 1.28 × 10$^3$ ml.g./hr., Residence time = 0.255 sec.
[b]Conversion based on the difference between the amount of methane added to the reactor and the amount of methane recovered.
[c]Reactor shut down due to catalyst plugging.

TABLE 13

Partial Oxidation of Methane Catalyst Derived From Mg$_4$Al$_2$(OH)$_{12}$CO$_3$

| HOURS ON STREAM | 1:57 | 148:12 |
|---|---|---|
| Conditions[a] | | |
| Temp. ° C. | 750.1 | 749.9 |
| Conversions: | | |
| CH$_4$, mol %[b] | 33.25 | 33.08 |
| O$^2$ | 97.07 | 99.56 |
| Selectivities, mol % | | |
| H$_2$ | 57.50 | 32.85 |
| CO | 25.61 | 30.69 |
| CO$_2$ | 69.96 | 57.46 |
| H$_2$/CO | | |

[a]Catalyzed volume = 4.0 ml. Feed gas flow rate = 100.6 ml./min., Space velocity = 1.51 × 10$^3$ hr$^{-1}$, Weight hourly space velocity = 3.18 × 10$^3$ ml.g./hr., Residence time = 0.255 sec.
[b]Conversion based on the difference between the amount of methane added to the reactor and the amount of methane recovered.

A ruthenium-on-titania catalyst (0.1 percent by weight ruthenium) was evaluated for the formation of synthesis gas using the apparatus, feed materials, and analysis methods described in Example 21. The reaction temperature was 750° C., catalyst volume was 4.0 mL, feed gas flow rate was 102.1 mL/min, space velocity was 1.53×10$^3$ hr$^{-1}$ weight hourly space velocity was 1.83×10$^3$ mL-g/hr, and the residence time was 0.251 sec.

After 284.25 hours of operations, methane conversion was 53.11 percent and O$_2$ conversion was 99.78 percent.

The selectivities for the products were as follows:

| Selectivity, Mole % | |
|---|---|
| H$_2$ | 109.40 |
| CO | 59.09 |
| CO2 | 40.91 |
| H$_2$/CO | 1.85 |

Thus, while the ruthenium-based catalyst did not coke in the period tested, the catalysts of this invention demonstrated superior conversions of methane and selectivity to synthesis gas.

Example 23

A ruthenium-on-titania catalyst (0.5 percent by weight ruthenium) was evaluated for the formation of synthesis gas as in Example 22. The reaction temperature was 750.8° C., catalyst volume was 4.0 mL, feed gas flow rate was 101.6 mL/min, space velocity was 1.52×10$^3$ hr$^{-1}$, weight hourly space velocity was 1.83×10$^3$ mL-g/hr, residence time was 0.252 sec.

After 279:55 hours of operation, methane conversion was 71.53 percent and $O_2$ conversion was 99.75 percent. The selectivity for the products were as follows:

| Selectivity, Mole % | |
| --- | --- |
| $H_2$ | 140.93 |
| CO | 80.65 |
| CO2 | 19.35 |
| $H_2$/CO | 1.75 |

As in Example 22, this ruthenium based catalyst did not coke during the time period tested, however, the catalysts of this invention are superior for the formation of synthesis gas by the oxidation of methane.

Procedure for Examples 24–30

Catalyst of this invention, other nickel-containing catalysts, and a molybdenum-based catalyst were evaluated for the conversion of methane to synthesis gas using carbon dioxide as the source of oxygen atoms. These evaluations were conducted using a fixed-bed, single-pass reactor consisting of a 9 mm×11 mm×30 inch quartz tube with indentations located 4 inches from the bottom of the tube. The reactor was operated in a downflow mode and a three-zone furnace was used to maintain isothermal conditions. Steam and condensible hydrocarbon products were collected in a cold trap. Exit gas flow rates were measured by a wet test meter. Hydrogen sulfide, if present, was removed from the product stream using a wet scrubber. Analysis were performed by gas chromatography.

For the following evaluations using carbon dioxide, unless otherwise noted, the reaction temperature was 816 C., the volumetric space velocity was 7200 $hr^{-1}$ at STP, pressure was 300 psig, the ratio of carbon dioxide to methane in the feed gas was 1.25, and the ratio of water to methane was 1.0. If used, hydrogen sulfide was at 27 ppm (by volume) in the feed gas. Using these ratios of feed gas components, the feed gas for the carbon dioxide reforming reactions was as follows:

| | Vol. % |
| --- | --- |
| $CO_2$ | 38.4 |
| $CH_4$ | 30.8 |
| $H_2O$ | 30.8 |
| $H_2S$ | 27 ppm |

Example 24

Hydrotalcite-derived catalyst prepared according to Example 8, sieved to 80–100 mesh, was evaluated for the carbon dioxide reforming of methane. A low concentration of hydrogen sulfide ($H_2S$) was in the feed. The results are reported in Table 14, and these data show that this catalyst is an effective catalyst for reforming using carbon dioxide. The methane and carbon dioxide conversions were 76 percent and 41 percent, respectively. Selectivity of the carbon to carbon monoxide was 99.5 percent.

Example 25

Table 14 shows the results for the reforming of methane using carbon dioxide in the presence of commercial nickel-containing reforming catalyst. The results are similar to that of Example 24, however, the conversion of carbon dioxide was lower.

Example 26

Table 14 shows the results for the reforming of methane using carbon dioxide in the presence of a molybdenum sulfide catalyst using the same conditions and feed materials used for Examples 24 and 25. Conversion of methane and carbon dioxide were significantly lower compared to Examples 24 and 25.

Example 27

Nickel catalyst prepared from Example 8 was tested under the same conditions used in Examples 24–26, however, the hydrogen sulfide was not included in the feed gases. Data from this run is also shown in Table 14. Conversion of methane and carbon dioxide were high at 77 percent and 40 percent, respectively. Carbon selectivity to carbon monoxide was 99.5 percent.

Water to methane ratio was decreased to 0.5 to evaluate the effect of reduced water concentration in feed gas. Temperature of the reaction was then increased to 867° C. Data from these runs are shown in Table 15.

Reduced water resulted in an increase in carbon dioxide conversion from 40 percent to 52 percent, and a decrease in the ratio of hydrogen to carbon monoxide in the syngas product. The higher reaction temperature increased the methane and carbon dioxide conversion to 82 percent and 60 percent, respectively. Therefore, low water to methane ratios and higher reaction temperature maximize carbon dioxide conversion.

Example 28

The commercial nickel containing catalyst was also evaluated using lower ratios of water to methane and higher reaction temperatures. These data are also in Table 15.

Example 29

The reforming of methane using carbon dioxide was evaluated using a physical mixture of nickel oxide on alpha alumina. The catalyst composition contained 75 weight percent NiO. The same reaction conditions were used as in Examples 24–26 except no hydrogen sulfide was added to the feed gas mixture. The data, which are presented in Table 14, shows that the conversion of methane and carbon dioxide were only 30 percent and 11 percent, respectively.

Example 30

The nickel spinel prepared according to the method of Example 16 was evaluated as a reforming catalyst for the formation of synthesis gas by the reaction of carbon monoxide with methane. The reaction conditions used were the same as those used in Examples 24–26 except there was no hydrogen spinfide in the feed gas. The data in Table 14 shows that the spinel, after 100 hours of operation, is an effective catalyst for reforming methane using carbon dioxide. The methane and carbon dioxide conversion were 86% and 47%, respectively. Selectivity of the carbon to carbon monoxide was 99.5%.

TABLE 14

| | | | ANALYSIS, VOL. % | | | | $H_2/C$ | CONV., % | | SEL. |
|---|---|---|---|---|---|---|---|---|---|---|
| Ex. # | Hours | $H_2S^a$ | $H_2$ | CO | $CH_4$ | $CO_2$ | O | $CH_4$ | $CO_2$ | CO |
| 24 | 170 | U | 43.1 | 31.8 | 6.4 | 18.5 | 1.36 | 76 | 41 | 99.5 |
| 25 | 120 | U | 41.2 | 31.4 | 6.5 | 20.8 | 1.31 | 76 | 38 | 99.5 |
| 26 | 120 | U | 30.1 | 22.8 | 18.4 | 28.4 | 1.32 | 47 | 26 | 99.0 |
| 27 | 150 | N | 42.4 | 32.0 | 6.2 | 19.2 | 1.30 | 77 | 40 | 99.5 |
| 28 | 150 | N | 42.6 | 32.9 | 6.0 | 18.4 | 1.30 | 77 | 42 | 99.5 |
| 29 | 4 | N | 24.8 | 13.6 | 24.2 | 37.1 | 1.80 | 30 | 11 | 99.0 |
| 30 | 100 | N | 44.4 | 35.2 | 3.6 | 15.9 | 1.30 | 86 | 47 | 99.5 |

$^a$Y = $H_2S$ was present; N = $H_2S$ not present.

TABLE 15

| | FEED GAS RATIOS$^a$ | | CONVERSION, % | | |
|---|---|---|---|---|---|
| CATALYST | Temp. °C | $H_2O/CH_4$ | $CH_4$ | $CO_2$ | $H_2/CO$ |
| Example 8 | 815 | 1.0 | 77 | 40 | 1.3 |
| | 815 | 0.5 | 70 | 52 | 1.0 |
| | 867 | 0.5 | 82 | 60 | 1.0 |
| Commercial Ni Cat. | 815 | 1.0 | 77 | 42 | 1.3 |
| | 815 | 0.5 | 71 | 53 | 1.0 |
| | 860 | 0.5 | 83 | 61 | 1.0 |
| | 860 | 0.25 | 79 | 68 | 0.8 |

$^a$Pressure was 300 psig, no hydorgen sulfide in feeds. Ratio of carbon dioxide to methane was 1.25.

Example 31

Catalyst prepared from nickel-containing hydrotalcite-like composition $[Ni_4Al_2(OH)_{12}]CO_3.4H_2O$ was compared to a commerical nickel-containing reforming catalyst for the reaction of methane with carbon dioxide. In this comparison, the gas hourly volumetric space velocity (GHSV) of the feed gas was varied and, as shown in Table 16, the catalyst of this invention was substantially more active in that conversions of methane at the high gas flow rates were considerably greater for the catalyst derived from the hydrotalcite-like catalyst precursor than for the commerical catalyst.

In this evluation, the catalyst (0.02 cc) was diluted with 50 parts by weight of alpha alumina per part of catalyst. Additionally, the catalyst bed was preceded by a 1 inch bed of alumina and followed by a 0.25 inch bed of alumina. The ratio of carbon dioxide to methane in the feed was 1.2, the ratio of water to methane was 1.0, and the feed gas was 50 percent diluted with nitrogen. The reaction pressure was 100 psig, and the reaction temperature was as shown in Table 16.

TABLE 16

| | CONVERSION OF METHANE (%) | | | | | |
|---|---|---|---|---|---|---|
| | Catalyst from $[Ni_4Al_2(OH)_{12}]CO_3$ | | | Commercial Catalyst | | |
| GHSV | 800° C. | 750° C. | 700° C. | 800° C. | 750° C. | 700° C. |
| $1.8 \times 10^5$ | | 80.1 | 65.0 | 90.2 | 79.7 | 61.1 |
| $3.6 \times 10^5$ | 91.0 | 80.1 | 63.8 | 86.8 | 77.1 | 48.5 |
| $5.4 \times 10^5$ | | 79.3 | | 81.7 | 70.1 | 31.3 |
| $7.2 \times 10^5$ | 89.7 | 78.9 | 59.0 | 76.1 | 63.4 | |
| $9.0 \times 10^5$ | | 77.9 | | 71.8 | 55.6 | |

TABLE 16-continued

| | CONVERSION OF METHANE (%) | | | | | |
|---|---|---|---|---|---|---|
| | Catalyst from $[Ni_4Al_2(OH)_{12}]CO_3$ | | | Commercial Catalyst | | |
| GHSV | 800° C. | 750° C. | 700° C. | 800° C. | 750° C. | 700° C. |
| $10.8 \times 10^5$ | 86.8 | 76.0 | 56.4 | 65.7 | 49.9 | |
| $12.6 \times 10^5$ | | 73.4 | | | | |

Example 32

Methane was stream-reformed to synthesis gas using the catalyst prepared according to Example 8 hereinabove. The same reactor was used as described hereinabove for Examples 24–30. The reactor was loaded with 0.33 grams (0.5 cc) of the catalyst (40–60 mesh size) and the catalyst bed was pretreated for 18 hours at 850° C. with a feed of water, hydrogen and nitrogen at a flow rate of 28,800 (volume gas/volume catalyst/hour at STP). The volumetric ratio of water, hydrogen gas and nitrogen gas was 109.1:10.9:120, respectively. After this pretreatment, the feed gas was changed to a 50/50 mole ratio of methane and water at a total gas flow rate of 120 sccm. After operating at these conditions, the composition of the gas exiting the reactor on a dry basis was as follows:

| COMPONENT | MOLE % |
|---|---|
| Methane | 6.6 |
| Carbon monoxide | 22.2 |
| Hydrogen gas | 69.1 |
| Carbon dioxide | 2.1 |
| $H_2/CO$ mole ratio | 3.1 |

This example demonstrates that the catalyst of this invention is effective for the steam reforming of methane using low ratios of water (steam) to methane. Using this low ratio, a low molar ratio (i.e., 3:1) of hydrogen-to-carbon monoxide in the synthesis gas product was formed. During this evaluation, there was no evidence of coke formation.

Example 33

A 0.5 L, 3-neck round bottom flask equipped with a thermometer, reflux condenser, and mechanical stirrer was charged with 200 mL deionized water, 10.0 g (0.071 mol) of Na$_2$CO$_3$, and 28.0 g (0.7 mol) of NaOH pellets. A second solution containing 51.3 g of Mg(NO$_3$)$_2$.6H$_2$O, 37.5 g of Al(NO$_3$)$_3$.9H$_2$O, and 160 mL of water was prepared and added dropwise to the first solution while stirring for a period of about 1 hour. After addition was complete, the gelatinous mixture was heated for about 15 hours at 80–85° C. The cooled mixture was then filtered, washed repeatedly with water, and dried overnight under vacuum at 70° C. The XRD of the material shows typical hydrotalcite-like structure having an interlayer spacing, widely termed a d(003) value, of approximately 7.6 Angstroms Given this X-ray diffraction data, known formulae for hydrotalcite-type structures, and the reagents which were charged as described above, one may reasonably conclude that the dried material contained a substantial proportion of hydrotalcite-type clay having the formula Mg$_4$Al$_2$(OH)$_{12}$CO$_3$.4H$_2$O Assuming that all of the magnesium nitrate and aluminum nitrate in the reagents reacted to completion to form hydrotalcite-type clay, one may calculate that the gelatinous mixture, before filtering or water washing, contained an amount of byproduct salt totaling 240 weight per cent on a dry basis, as compared to the weight of the hydrotalcite-type clay. In the above described procedure, most of this byproduct salt was carried for disposal with the filtrate water and spent wash water.

Example 34

The material described in example 33 is calcined by placing a weighed amount of the material in a calciner and raising the temperature at 20° C./min. until a temperature of 450° C. to 500° C. is reached. The material is kept at that temperature for about 15 hours and then sieved to different mesh sizes. These sized materials are further calcined at 850° C.

Example 35

In Examples 35 and 36 hydrotalcite-like materials having the formula Mg$_4$Al$_2$(OH)$_{12}$CO$_3$ were formed from a slurry of divalent metal oxide and an alumina sol with and without filtering or washing. Such examples are also disclosed in commonly assigned and copending U.S. application Ser. No. 08/736,949 filed Oct. 25, 1996 which is a continuation-in-part of U.S. application Ser. No. 08/720,797 filed Oct. 1, 1996 which is a divisional of U.S. application Ser. No. 08/488,872 filed Jun. 9, 1995 now U.S. Pat. No. 5,591,418, which is a continuation-in-part of U.S. application Ser. No. 08/252,175 filed Jun. 1, 1994 now U.S. Pat. No. 5,426,083. Each of the above-described applications is hereby incorporated by reference in its entirety.

A hydrotalcite-like material was prepared formed from a slurry of divalent metal oxide and an alumina sol without filtering or washing in the following manner using reagents which contained 50 weight percent excess sodium carbonate (Na$_2$CO$_3$). It is calculated that this amount of excess sodium carbonate gives rise to 3.63 grams of waste sodium carbonate in the product, which corresponds to 3.99 weight percent of the salts which would have been produced as byproducts utilizing the classical all-nitrate preparation method, as described above in Example 33.

A three-neck round bottom flask equipped with a thermometer, a water cooled reflux condenser and a mechanical stirrer was charged with a first combination having a pH of 10.8 and including 80 milliliters of distilled water and 10.91 grams (0.1029 mol) of sodium carbonate. A second combination having a pH of 10.9 was prepared by blending 566 milliliters of distilled water and 11.33 grams (0.2744 mol) of magnesium oxide. A third combination contained 512 grams of an aqueous mixture consisting of 7.0 grams (0.0686 mol) of alumina which was introduced in the pseudo boelimite form (at 75% alumina content), 1.75 grams of acetic acid, and water. The second and third combinations were simultaneously added to the flask with stirring via separate addition funnels over a period of ten minutes.

After the additions were complete, a pH alkalinity of 10.5 was measured in the contents of the flask. The contents were stirred continuously, while formation of a gelatinous mixture took place in the flask. The gelatinous mixture was heated to 80° C. for 22 hours with continuous stirring. After that time, the gelatinous mixture was cooled and tested for pH alkalinity, which was determined to be 12.4. A portion of the gelatinous mixture was then removed and designated Sample H-1. The remaining portion of the gelatinous mixture was designated Sample H-2, which is discussed in Example 36, below.

No effort was made to filter the mixture or water wash the removed portion, designated Sample H-1, in contrast to the procedures described in Example 33 above. Subsequently, the removed portion mixture was dried overnight at 80° C. under vacuum. The dried product, which weighed 1.04 grams, was subsequently analyzed by X-ray diffraction techniques.

The analysis indicates that product was substantially composed of layered double hydroxides having a hydrotalcite-type structure. For example, the most intense of the peaks occured at a sample orientation angle of 11.5 degrees, indicating a layered structure having an interlayer spacing of 7.8 Angstrom units. Similarly, the other peaks correspond to various structural dimensions commonly associated with hydrotalcite-type structures. On the basis of known formulae for hydrotalcite-type structures, the amounts of the reagents employed, and the X-ray diffraction results, one may reasonably conclude that the product is rich in the layered double hydroxide having the formula Mg$_4$Al$_2$(OH)$_{12}$C$_3$.

Moreover, the layered mixed double hydroxide composition, which was produced without the benefit of any filtering or water washing steps, was remarkably free of salts and salt byproducts. Taking the formula of layered double hydroxide as formula Mg$_4$Al$_2$(OH)$_{12}$CO$_3$ and assuming complete reaction of the magnesium oxide and alumina, one may calculate that the amount of sodium carbonate present, as compared to the amounts of the other reagents, was 50 percent in excess of the amount stoichiometrically required. It is well-known that neither magnesium oxide nor alumina forms a salt in contact with an aqueous phase having an pH alkalinity of 7 or more. No salts other than sodium carbonate were present in the reagents.

This example demonstrated that a divalent metal hydroxide slurry can, under appropriate conditions, be combined with a trivalent metal oxide sol to produce a layered mixed double hydroxide composition.

Example 36

The remaining portion of the gelatinous mixture, Sample H-2 which was described above in Example 35, was filtered once and washed three times. Each of the washes utilized one liter of water, for a total of three liters of wash water. The filtrate was evaporated to dryness, and a white residue weighing only 8.9 grams was isolated. A significant proportion of this residue was determined by X-ray diffraction to be sodium carbonate. This result compares favorably with the theoretical excess amount of sodium carbonate charged, which is calculated as 3.63 grams. X-ray diffraction analysis also indicated that much of the balance of the residue was composed of a clay material similar to the clay designated Sample I in Example 35, above.

A filter cake remained after filtration and washing of Sample H-2. The filter cake was dried and found to weigh 27.9 grams. X-ray diffraction confirmed that the filter cake was composed of material similar to the dried product of Example 35.

Example 37

In Examples 37 and 38 hydrotalcite materials having the formula $Ni_4Al_2(OH)_{12}CO_3$ are formed from a slurry of divalent metal oxide and an alumina sol with and without filtering or washing.

A hydrotalcite material is prepared formed from a slurry of divalent metal oxide and an alumina sol without filtering or washing in the following manner using reagents which containe 50 weight percent excess sodium carbonate. It is calculated that this amount of excess sodium carbonate gives rise to 3.63 grams of waste sodium carbonate in the product, which corresponds to 3.99 weight percent of the salts which would have been produced as byproducts utilizing the classical all-nitrate preparation method, as described above in Example 33.

A three-neck round bottom flask equipped with a thermometer, a water cooled reflux condenser and a mechanical stirrer is charged with a first combination having a pH of 10.8 and including 80 milliliters of distilled water and 10.91 grams (0.1029 mol) of sodium carbonate. A second combination having a pH of 10.9 is prepared by blending 566 milliliters of distilled water and 20.49 grams (0.2744 mol) of nickel oxide. A third combination contained 512 grams of an aqueous mixture consisting of 7.0 grams (0.0686 mol) of alumina which is introduced in the pseudo boelimite form (at 75% alumina content), 1.75 grams of acetic acid, and water. The second and third combinations are simultaneously added to the flask with stirring via separate addition funnels over a period of ten minutes.

After the additions are complete, a pH alkalinity of about 10.5 is measured in the contents of the flask. The contents are stirred continuously, while formation of a gelatinous mixture takes place in the flask. The gelatinous mixture is heated to 80° C. for 22 hours with continuous stirring. After that time, the gelatinous mixture is cooled and tested for pH alkalinity, which is determined to be about 12.4. A portion of the gelatinous mixture is then removed and designated Sample N-1. The remaining portion of the gelatinous mixture is designated Sample N-2, which is discussed in Example 36, below.

No effort is made to filter the mixture or water wash the removed portion, designated Sample N-1, in contrast to the procedures described above using salts. Subsequently, the removed portion mixture is dried overnight at 80° C. under vacuum. The dried product is subsequently analyzed by X-ray diffraction techniques.

Analysis indicates that product is substantially composed of layered double hydroxides having a hydrotalcite-type structure. On the basis of known formulae for hydrotalcite-type structures, the amounts of the reagents employed, and the X-ray diffraction results, one may reasonably conclude that the product is rich in the layered double hydroxide having the formula $Ni_4Al_2(OH)_{12}CO_3$.

Moreover, the layered mixed double hydroxide composition, which is produced without the benefit of any filtering or water washing steps, is remarkably free of salts and salt byproducts. Taking the formula of layered double hydroxide as formula $Ni_4Al_2(OH)_{12}CO_3$ and assuming complete reaction of the magnesium oxide and alumina, one may calculate that the amount of sodium carbonate present, as compared to the amounts of the other reagents, was 50 percent in excess of the amount stoichiometrically required. It is well-known that neither nickel oxide nor alumina forms a salt in contact with an aqueous phase having an pH alkalinity of 7 or more. No salts other than sodium carbonate are present in the reagents.

Example 38

The remaining portion of the gelatinous mixture, Sample N-2 which was described above in Example 37, is filtered once and washed three times. Each of the washes utilizes one liter of water, for a total of three liters of wash water. The filtrate is evaporated to dryness, and a significant proportion of this residue is determined by X-ray diffraction to be sodium carbonate. X-ray diffraction analysis also indicates that much of the balance of the residue is composed of a clay material similar to the clay in Example 37 above.

A filter cake remained after filtration and washing of Sample N-2. The filter cake is dried and X-ray diffraction confirms that the filter cake is composed of material similar to the dried product of Example 37.

Example 39

Materials described in Examples 37 and 39 are calcined by placing weighed amounts of each material in a calciner and raising the temperature at 20° C./min. until a temperature of 450° C. to 500° C. is reached. Each material is kept at that temperature for about 15 hours and then sieved to different mesh sizes. These sized materials are further calcined at 850° C.

Example 40

The nickel-containing catalysts derived from hydrotalcite-type materials as described in Example 39 are evaluated as reforming catalysst for the formation of synthesis gas by the reaction of carbon monoxide with methane. The reaction conditions used are the same as those used in Examples 24–26 except there was no hydrogen sulfide in the feed gas. Results show that each of these materials, is an effective catalyst for reforming of methane with carbon dioxide and/or water. Both methane and carbon dioxide conversion are good and selectivity of the carbon to carbon monoxide is very high.

Having described the invention, that which is claimed is:

1. A process for manufacturing a dehydrated nickel-containing material which comprises:

(1-A) Blending in an aqueous medium (i) about two molar parts of one or more divalent metal compound none of which is a salt and comprises $Ni^{2+}$ ions, or $Ni^{2+}$ ions and at least one other divalent metal ion selected from the group consisting of $Mg^{2+}$, $Cu^{2+}$, $Co^{2+}$, $Zn^{2+}$, $Fe^{2+}$ and $Mn^{2+}$ ions, (ii) about one molar part in sum of a trivalent compound which is not a salt and comprises at least $Al^{3+}$ ions and optionally another selected from the group consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions, and (iii) about one-half to about one molar part of a water soluble interstitial anion precursor, to produce a mixture;

(1-B) Heating the mixture to a temperature in a range of about 50° C. to about 100° C. and maintaining the mixture at elevated temperature for at least about one hour to form an anionic layered mixed hydroxide;

(1-C) Recovering the anionic layered mixed hydroxide from the mixture; and (1-D) Calcining the recovered layered mixed hydroxide for not less than about one hour at a temperature of about 450° C. or hotter, to produce a dehydrated material.

2. The process of claim 1 wherein the water soluble interstitial anion precursor is carbonate.

3. The process of claim 1 further comprising heat treating, to a temperature of at least about 700° C. under reforming conditions, the dehydrated material of step 1-D to produce an at least partially collapsed composition for use as a catalyst for reforming of a hydrocarbyl compound to prepare synthesis gas comprising a mixture of carbon monoxide and molecular hydrogen.

4. The process of claim 3 wherein the heat treating is carried out under reforming conditions, and the composition for use as a catalyst contains metal particles of about 1 nanometer to about 1000 nanometers in size and containing at least nickel in the zero oxidation state.

5. The process of claim 4 wherein the composition for use as a catalyst comprises (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions.

6. The process of claim 5 wherein $M^{2+}$ is $Ni^{2+}$, and the crystallites are about 5 nanometers to about 400 nanometers in size.

7. The process of claim 1 wherein the divalent metal compound comprises $Ni^{2+}$ ions or mixture of $Ni^{2+}$ ions and another divalent metal ion selected from the group consisting of $Mg^{2+}$, $Zn^{2+}$ and $Cu^{2+}$ ions.

8. The process of claim 7 wherein the trivalent metal ions are $Al^{3+}$ ions, and the water soluble interstitial anion precursor is carbonate.

9. The process of claim 1 wherein the divalent metal compounds comprises $Ni^{2+}$ ions and $Mg^{2+}$ ions, the trivalent metal ions are $Al^{3+}$ ions, and the water soluble interstitial anion precursor is carbonate.

10. The process of claim 1 wherein the anionic layered mixed hydroxide is hydrotalcite-like compound having formula:

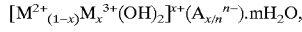

wherein $M^{2+}$ is a metal ion having a valence of 2+ and is $Ni^{2+}$ or a mixture of $Ni^{2+}$ and another ion selected from the group consisting of $Mg^{2+}$, $Zn^{2+}$ and $Cu^{2+}$; $M^{3+}$ is at least one metal ion having a valence of 3+ and is at least $Al^{3+}$; x is a number greater than about 0.25 to about 0.50; $A^{n-}$ is an anion having a negative charge n; and m is 0 or a positive number.

11. The process of claim 10 further comprising heat treating, to a temperature in the range of about 800° C. to about 1050° C. under reforming conditions, the dehydrated material of step 1-D to produce an at least partially collapsed composition for use as a catalyst for reforming of a hydrocarbyl compound to prepare synthesis gas comprising a mixture of carbon monoxide and molecular hydrogen, wherein the catalyst comprises (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions.

12. A composition formed by heat treating to a temperature of at least about 700° C. under conditons for reforming of a hydrocarbyl compound to prepare synthesis gas comprising a mixture of carbon monoxide and molecular hydrogen, a dehydrated nickel-containing material manufactured by a process which comprises:

(12-A) Blending in an aqueous medium (i) about two molar parts of one or more divalent metal compound none of which is a salt and comprises $Ni^{2+}$ ions, or $Ni^{2+}$ ions and another divalent metal ion selected from the group consisting of $Mg^{2+}$, $Zn^{2+}$ and $Cu^{2+}$ ions, and (ii) about one molar part in sum of a trivalent compound which is not a salt and comprises at least $Al^{3+}$ ions and optionally another selected from the group consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions, and (iii) about one-half to about one molar part of a water soluble interstitial anion precursor, to produce a mixture;

(12-B) Heating the mixture to a temperature in a range of about 50° C. to about 100° C. and maintaining the mixture at elevated temperature for at least about one hour to form an anionic layered mixed hydroxide;

(12-C) Recovering the anionic layered mixed hydroxide from the mixture; and (12-D) Calcining the recovered layered mixed hydroxide for not less than about one hour at a temperature of about 450° C. or hotter, to produce a dehydrated nickel-containing material.

13. The composition of claim 12 wherein the water soluble interstitial anion precursor is carbonate.

14. The composition of claim 12 wherein the resulting compostion comprises (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^2+$ or a mixture of $Ni^2+$ plus another metal ion or plus other metal ions.

15. The composition of claim 14 wherein the heat treating is to a temperature of at least 800° C.

* * * * *